US009183066B2

(12) United States Patent
Arnold et al.

(10) Patent No.: US 9,183,066 B2
(45) Date of Patent: Nov. 10, 2015

(54) DOWNLOADABLE SMART PROXIES FOR PERFORMING PROCESSING ASSOCIATED WITH A REMOTE PROCEDURE CALL IN A DISTRIBUTED SYSTEM

(75) Inventors: Kenneth C. R. C. Arnold, Lexington, MA (US); James H. Waldo, Dracut, MA (US); Robert Scheifler, Somerville, MA (US); Ann M. Wollrath, Groton, MA (US)

(73) Assignee: Oracle America Inc., Redwood City, CA (US)

( * ) Notice: Subject to any disclaimer, the term of this patent is extended or adjusted under 35 U.S.C. 154(b) by 3778 days.

(21) Appl. No.: 10/138,424

(22) Filed: May 6, 2002

(65) Prior Publication Data

US 2002/0199036 A1    Dec. 26, 2002

Related U.S. Application Data

(63) Continuation of application No. 09/044,930, filed on Mar. 20, 1998, now Pat. No. 6,393,497.

(51) Int. Cl.
*G06F 9/54*          (2006.01)
*G06F 9/46*          (2006.01)

(52) U.S. Cl.
CPC ............ *G06F 9/547* (2013.01); *G06F 9/465* (2013.01); *G06F 9/548* (2013.01)

(58) Field of Classification Search
CPC .......... G06F 9/547; G06F 9/548; G06F 9/465
USPC .................. 719/315, 330–332; 709/201, 203
See application file for complete search history.

(56) References Cited

U.S. PATENT DOCUMENTS

| | | | |
|---|---|---|---|
| 3,449,669 A | 6/1969 | Carl-Erik Granqvist |
| 4,430,699 A | 2/1984 | Segarra et al. |
| 4,491,946 A | 1/1985 | Kryskow, Jr. et al. |
| 4,558,413 A | 12/1985 | Schmidt et al. |
| 4,567,359 A | 1/1986 | Lockwood |
| 4,713,806 A | 12/1987 | Oberlander et al. |
| 4,800,488 A | 1/1989 | Agrawal et al. |
| 4,809,160 A | 2/1989 | Mahon et al. |
| 4,819,233 A | 4/1989 | Delucia et al. |
| 4,823,122 A | 4/1989 | Mann et al. |

(Continued)

FOREIGN PATENT DOCUMENTS

| | | |
|---|---|---|
| EP | 0 300 516 A2 | 1/1989 |
| EP | 0 351 536 A3 | 1/1990 |

(Continued)

OTHER PUBLICATIONS

"Consumers Can View, Share Picture On-Line as Kodak Picture Network Goes 'Live'," Business Wire, Aug. 25, 1997, pp. 18-19.

(Continued)

*Primary Examiner* — Kenneth R Coulter
(74) *Attorney, Agent, or Firm* — Marsh Fischmann & Breyfogle LLP

(57) ABSTRACT

Use of a smart proxy as a wrapper around a stub in a distributed system. Instead of receiving a stub as a result of a remote procedure call, a caller receives a smart proxy including the stub as an embedded object. The smart proxy performs predefined processing associated with a remote procedure call, the processing possibly occurring before, during, or after a response to the call.

16 Claims, 8 Drawing Sheets

(56) References Cited

U.S. PATENT DOCUMENTS

| | | | |
|---|---|---|---|
| 4,939,638 A | 7/1990 | Stephenson et al. | |
| 4,956,773 A | 9/1990 | Saito et al. | |
| 4,992,940 A | 2/1991 | Dworkin | |
| 5,088,036 A | 2/1992 | Ellis et al. | 395/425 |
| 5,101,346 A | 3/1992 | Ohtsuki | |
| 5,109,486 A | 4/1992 | Seymour | |
| 5,187,787 A | 2/1993 | Skeen et al. | 395/600 |
| 5,218,699 A | 6/1993 | Brandle et al. | |
| 5,253,165 A | 10/1993 | Leiseca et al. | |
| 5,257,369 A | 10/1993 | Skeen et al. | 395/650 |
| 5,293,614 A | 3/1994 | Ferguson et al. | 395/600 |
| 5,297,283 A | 3/1994 | Kelly, Jr. et al. | |
| 5,303,042 A | 4/1994 | Lewis et al. | |
| 5,307,490 A | 4/1994 | Davidson et al. | |
| 5,311,591 A | 5/1994 | Fischer | |
| 5,319,542 A | 6/1994 | King, Jr. et al. | |
| 5,327,559 A | 7/1994 | Priven et al. | |
| 5,339,430 A | 8/1994 | Lundin et al. | |
| 5,339,435 A | 8/1994 | Lubkin et al. | |
| 5,341,477 A | 8/1994 | Pitkin et al. | |
| 5,386,568 A | 1/1995 | Wold et al. | |
| 5,390,328 A | 2/1995 | Frey et al. | |
| 5,392,280 A | 2/1995 | Zheng | |
| 5,423,042 A | 6/1995 | Jalili et al. | |
| 5,440,744 A | 8/1995 | Jacobson et al. | |
| 5,446,901 A | 8/1995 | Owicki et al. | |
| 5,448,740 A | 9/1995 | Kiri et al. | |
| 5,452,459 A | 9/1995 | Drury et al. | |
| 5,455,952 A | 10/1995 | Gjovaag | |
| 5,459,837 A | 10/1995 | Caccavale | |
| 5,471,629 A | 11/1995 | Risch | |
| 5,475,792 A | 12/1995 | Stanford et al. | |
| 5,475,817 A | 12/1995 | Waldo et al. | |
| 5,475,840 A | 12/1995 | Nelson et al. | |
| 5,481,721 A | 1/1996 | Serlet et al. | |
| 5,491,791 A | 2/1996 | Glowny et al. | |
| 5,504,921 A | 4/1996 | Dev et al. | |
| 5,506,984 A | 4/1996 | Miller | |
| 5,511,196 A | 4/1996 | Shackelford et al. | |
| 5,511,197 A | 4/1996 | Hill et al. | |
| 5,524,244 A | 6/1996 | Robinson et al. | |
| 5,544,040 A | 8/1996 | Gerbaulet | |
| 5,548,724 A | 8/1996 | Akizawa et al. | |
| 5,548,726 A | 8/1996 | Pettus | |
| 5,553,282 A | 9/1996 | Parrish et al. | |
| 5,555,367 A | 9/1996 | Premerlani et al. | |
| 5,555,427 A | 9/1996 | Aoe et al. | |
| 5,557,798 A | 9/1996 | Skeen et al. | 395/650 |
| 5,560,003 A | 9/1996 | Nilsen et al. | 395/600 |
| 5,561,785 A | 10/1996 | Blandy et al. | 395/497.01 |
| 5,577,231 A | 11/1996 | Scalzi et al. | |
| 5,592,375 A | 1/1997 | Salmon et al. | |
| 5,594,921 A | 1/1997 | Pettus | |
| 5,603,031 A | 2/1997 | White et al. | 395/683 |
| 5,617,537 A | 4/1997 | Yamada et al. | |
| 5,628,005 A | 5/1997 | Hurvig | |
| 5,640,564 A | 6/1997 | Hamilton et al. | |
| 5,644,720 A | 7/1997 | Boll et al. | |
| 5,644,768 A | 7/1997 | Periwal et al. | |
| 5,652,888 A | 7/1997 | Burgess | |
| 5,655,148 A | 8/1997 | Richman et al. | 395/828 |
| 5,659,751 A | 8/1997 | Heninger | 395/685 |
| 5,664,110 A | 9/1997 | Green et al. | |
| 5,664,111 A | 9/1997 | Nahan et al. | |
| 5,664,191 A | 9/1997 | Davidson et al. | |
| 5,666,493 A | 9/1997 | Wojcik et al. | |
| 5,671,225 A | 9/1997 | Hooper et al. | |
| 5,671,279 A | 9/1997 | Elgamal | |
| 5,674,982 A | 10/1997 | Greve et al. | |
| 5,675,796 A | 10/1997 | Hodges et al. | |
| 5,675,797 A | 10/1997 | Chung et al. | |
| 5,680,573 A | 10/1997 | Rubin et al. | |
| 5,680,617 A | 10/1997 | Gough et al. | |
| 5,682,534 A | 10/1997 | Kapoor et al. | |
| 5,684,955 A | 11/1997 | Meyer et al. | |
| 5,689,709 A | 11/1997 | Corbett et al. | |
| 5,694,551 A | 12/1997 | Doyle et al. | |
| 5,706,435 A | 1/1998 | Barbará et al. | |
| 5,706,502 A | 1/1998 | Foley et al. | |
| 5,710,887 A | 1/1998 | Chelliah et al. | |
| 5,715,314 A | 2/1998 | Payne et al. | |
| 5,721,825 A | 2/1998 | Lawson et al. | |
| 5,721,832 A | 2/1998 | Westrope et al. | |
| 5,724,540 A | 3/1998 | Kametani | |
| 5,724,588 A * | 3/1998 | Hill et al. | 719/328 |
| 5,727,048 A | 3/1998 | Hiroshima et al. | |
| 5,727,145 A | 3/1998 | Nessett et al. | |
| 5,729,594 A | 3/1998 | Klingman | |
| 5,734,706 A | 3/1998 | Windsor et al. | |
| 5,737,607 A | 4/1998 | Hamilton et al. | |
| 5,742,768 A | 4/1998 | Gennaro et al. | |
| 5,745,678 A | 4/1998 | Herzberg et al. | |
| 5,745,695 A | 4/1998 | Gilchrist et al. | |
| 5,745,703 A | 4/1998 | Cejtin et al. | |
| 5,745,755 A | 4/1998 | Covey | |
| 5,748,897 A | 5/1998 | Katiyar | |
| 5,754,849 A | 5/1998 | Dyer et al. | |
| 5,754,977 A | 5/1998 | Gardner et al. | |
| 5,757,925 A | 5/1998 | Faybishenko | |
| 5,758,077 A | 5/1998 | Danahy et al. | |
| 5,758,328 A | 5/1998 | Giovannoli | |
| 5,758,344 A | 5/1998 | Prasad et al. | |
| 5,761,507 A | 6/1998 | Govett | |
| 5,761,656 A | 6/1998 | Ben-Shachar | |
| 5,764,897 A | 6/1998 | Khalidi | |
| 5,764,915 A | 6/1998 | Heimsoth et al. | |
| 5,764,982 A | 6/1998 | Madduri | |
| 5,768,532 A | 6/1998 | Megerian | |
| 5,774,551 A | 6/1998 | Wu et al. | |
| 5,774,729 A | 6/1998 | Carney et al. | |
| 5,778,179 A | 7/1998 | Kanai et al. | |
| 5,778,187 A | 7/1998 | Monteiro et al. | |
| 5,778,228 A | 7/1998 | Wei | |
| 5,778,368 A | 7/1998 | Hogan et al. | |
| 5,784,560 A | 7/1998 | Kingdon et al. | |
| 5,787,425 A | 7/1998 | Bigus | |
| 5,787,431 A | 7/1998 | Shaughnessy | |
| 5,790,548 A | 8/1998 | Sistanizadeh et al. | |
| 5,790,677 A | 8/1998 | Fox et al. | |
| 5,794,207 A | 8/1998 | Walker et al. | |
| 5,799,173 A | 8/1998 | Gossler et al. | |
| 5,802,367 A | 9/1998 | Held et al. | |
| 5,805,805 A | 9/1998 | Civanlar et al. | |
| 5,806,042 A | 9/1998 | Kelly et al. | |
| 5,808,911 A | 9/1998 | Tucker et al. | |
| 5,809,144 A | 9/1998 | Sirbu et al. | |
| 5,809,507 A | 9/1998 | Cavanaugh, III | |
| 5,812,819 A | 9/1998 | Rodwin et al. | |
| 5,813,013 A | 9/1998 | Shakib et al. | |
| 5,815,149 A | 9/1998 | Mutschler, III et al. | |
| 5,815,709 A | 9/1998 | Waldo et al. | |
| 5,815,711 A | 9/1998 | Sakamoto et al. | |
| 5,818,448 A | 10/1998 | Katiyar | |
| 5,829,022 A | 10/1998 | Watanabe et al. | |
| 5,832,219 A | 11/1998 | Pettus | |
| 5,832,529 A | 11/1998 | Wollrath et al. | |
| 5,832,593 A | 11/1998 | Wurst et al. | |
| 5,835,737 A | 11/1998 | Sand et al. | |
| 5,842,018 A | 11/1998 | Atkinson et al. | |
| 5,844,553 A | 12/1998 | Hao et al. | |
| 5,845,090 A | 12/1998 | Collins, III et al. | |
| 5,845,129 A | 12/1998 | Wendorf et al. | |
| 5,850,442 A | 12/1998 | Muftic | |
| 5,860,004 A | 1/1999 | Fowlow et al. | |
| 5,860,153 A | 1/1999 | Matena et al. | |
| 5,864,862 A | 1/1999 | Kriens et al. | |
| 5,864,866 A | 1/1999 | Henckel et al. | |
| 5,872,928 A | 2/1999 | Lewis et al. | |
| 5,872,973 A | 2/1999 | Mitchell et al. | |
| 5,875,335 A | 2/1999 | Beard | |
| 5,878,411 A | 3/1999 | Burroughs et al. | |
| 5,884,024 A | 3/1999 | Lim et al. | |
| 5,884,079 A | 3/1999 | Furusawa | |
| 5,887,134 A | 3/1999 | Ebrahim | |

(56) References Cited

U.S. PATENT DOCUMENTS

| | | | |
|---|---|---|---|
| 5,887,172 A | 3/1999 | Vasudevan et al. |
| 5,889,951 A | 3/1999 | Lombardi |
| 5,889,988 A | 3/1999 | Held |
| 5,890,158 A | 3/1999 | House et al. |
| 5,892,904 A | 4/1999 | Atkinson et al. |
| 5,905,868 A | 5/1999 | Baghai et al. |
| 5,913,029 A | 6/1999 | Shostak |
| 5,915,112 A | 6/1999 | Boutcher |
| 5,925,108 A | 7/1999 | Johnson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,949,998 A | 9/1999 | Fowlow et al. |
| 5,951,652 A | 9/1999 | Ingrassia, Jr. et al. |
| 5,956,509 A | 9/1999 | Kevner |
| 5,960,404 A | 9/1999 | Chaar et al. |
| 5,961,582 A | 10/1999 | Gaines |
| 5,963,924 A | 10/1999 | Williams et al. |
| 5,963,947 A | 10/1999 | Ford et al. |
| 5,966,435 A | 10/1999 | Pino |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,978,773 A | 11/1999 | Hudetz et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,065 A | 12/1999 | Yan et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,014,686 A | 1/2000 | Elnozahy et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,041,351 A | 3/2000 | Kho |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,061,713 A | 5/2000 | Bharadhwaj |
| 6,067,575 A | 5/2000 | McManis et al. |
| 6,078,655 A | 6/2000 | Fahrer et al. |
| 6,085,030 A | 7/2000 | Whitehead et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A | 12/2000 | Kaminsky et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,138 B1 | 4/2001 | Wells et al. |
| 6,216,158 B1 | 4/2001 | Luo et al. |
| 6,219,675 B1 | 4/2001 | Pal et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,269,401 B1 | 7/2001 | Fletcher et al. |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,321,275 B1 | 11/2001 | McQuistan et al. |
| 6,327,677 B1 | 12/2001 | Garg et al. |
| 6,339,783 B1 | 1/2002 | Horikiri |
| 6,343,308 B1 | 1/2002 | Marchesseault |
| 6,351,735 B1 | 2/2002 | Deaton et al. |
| 6,360,266 B1 | 3/2002 | Pettus |
| 6,363,409 B1 | 3/2002 | Hart et al. |
| 6,378,001 B1 | 4/2002 | Aditham et al. |
| 6,385,643 B1 | 5/2002 | Jacobs et al. |
| 6,408,342 B1 | 6/2002 | Moore et al. |
| 6,418,468 B1 | 7/2002 | Ahlstrom et al. |
| 6,505,248 B1 | 1/2003 | Casper et al. |
| 6,564,174 B1 | 5/2003 | Ding et al. |
| 6,578,074 B1 | 6/2003 | Bahlmann |
| 6,603,772 B1 | 8/2003 | Moussavi et al. |
| 6,604,127 B2 | 8/2003 | Murphy et al. |
| 6,604,140 B1 | 8/2003 | Beck et al. |
| 6,654,793 B1 | 11/2003 | Wollrath et al. |
| 6,704,803 B2 | 3/2004 | Wilson et al. |
| 6,757,262 B1 | 6/2004 | Weisshaar et al. |
| 6,757,729 B1 | 6/2004 | Devarakonda et al. |
| 6,801,940 B1 | 10/2004 | Moran et al. |
| 6,801,949 B1 | 10/2004 | Bruck et al. |
| 6,804,711 B1 | 10/2004 | Dugan et al. |
| 6,804,714 B1 | 10/2004 | Tummalapalli |
| 2001/0003824 A1 | 6/2001 | Schnier |
| 2001/0011350 A1 | 8/2001 | Zabetian |
| 2002/0032803 A1* | 3/2002 | Marcos et al. ................ 709/315 |
| 2002/0059212 A1 | 5/2002 | Takagi |
| 2002/0073019 A1 | 6/2002 | Deaton |
| 2002/0111814 A1 | 8/2002 | Barnett et al. |
| 2003/0005132 A1 | 1/2003 | Nguyen et al. |
| 2003/0084204 A1 | 5/2003 | Wollrath et al. |
| 2003/0191842 A1 | 10/2003 | Murphy et al. |

FOREIGN PATENT DOCUMENTS

| | | | |
|---|---|---|---|
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A | 10/1997 |
| EP | 0 805 393 A2 | 11/1997 |
| EP | 0 810 524 A | 12/1997 |
| EP | 0 817 020 A | 1/1998 |
| EP | 0 817 022 A2 | 1/1998 |

(56) References Cited

FOREIGN PATENT DOCUMENTS

| | | |
|---|---|---|
| EP | 0 817 025 A | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO 92/07335 | 4/1992 |
| WO | WO 92/09948 | 6/1992 |
| WO | WO93/25962 A1 | 12/1993 |
| WO | WO 94/03855 | 2/1994 |
| WO | WO 96/03692 A1 | 2/1996 |
| WO | WO 96/10787 | 4/1996 |
| WO | WO 96/18947 | 6/1996 |
| WO | WO 96/24099 | 8/1996 |
| WO | WO 98/02814 | 1/1998 |
| WO | WO 98/04971 | 2/1998 |
| WO | WO99/17194 | 4/1999 |
| WO | WO01/13228 A2 | 2/2001 |
| WO | WO01/86394 A2 | 11/2001 |
| WO | WO01/90903 A1 | 11/2001 |

OTHER PUBLICATIONS

"Eden Project Proposal," Department of Computer Science, University of Washington, Oct. 1980, Technical Report #80-10-01, cover and Foreword.
"ISN Dataweb Sells Software, Hardware," Datamation, Apr. 1, 1996, p. 40.
"Kodak DC220 and DC260 Digital Cameras Are Shipping to Retailers Across the Country Cameras Are Optimized for USB Interface Supported in Windows 98," Business Wire, Jun. 24, 1998, pp. 42-44.
"Kodak demonstrates leadership across entire photographic category," M2 Presswire, Feb. 13, 1998, pp. 31-35.
"Kodak PhotoNet Online Makes It a Snap to Share Summer Photos," PR Newswire, Jul. 2, 1998, pp. 63-64.
"Kodak Picture Network Sends Prints Home From the Holidays," Business Wire, Dec. 29, 1997, pp. 58-60.
"Photo processing made easy on the Internet; Storm Software and PictureVision team up with Konica Corp.," Business Wire, Feb. 22, 1996, pp. 3-4.
"Seeing your photos a whole new way," Business Wire, Dec. 12, 1996, pp. 9-10.
"Webwatch: MCI Announces Internet Access," Boardwatch Magazine, Jan. 1995.
Administrator's Guide, Netscape Enterprise Server, Version 3.0, Netscape Communications Corp., 1998.
Almes et al., "Edmas: A Locally Distributed Mail System," Department of Computer Science, University of Washington, Technical Report 83-07-01, Jul. 7, 1983, Abstract & pp. 1-17.
Almes et al., "Research in Integrated Distributed Computing," Department of Computer Science, University of Washington, Oct. 1979, pp. 1-42.
Almes et al., "The Eden System: A Technical Review," Department of Computer Science, University of Washington, Technical Report 83-10-05, Oct. 1983, pp. 1-25.
Almes, "Integration and Distribution in the Eden System," Department of Computer Science, University of Washington, Technical Report 83-01-02, Jan. 19, 1983, pp. 1-18 & Abstract.
Almes, "The Evolution of the Eden Invocation Mechanism," Department of Computer Science, University of Washington, Technical Report 83-01-03, Jan. 19, 1983, pp. 1-14 & Abstract.
Arnold, Ken, "The Jini Architecture: Dynamic Services in a Flexible Network," Sun Microsystems, Inc., Proceedings of the 36th ACM IEEE Design Automation Conference, Jun. 1999, pp. 157-162.
Bandrowski, "Stores Without Doors: Kiosks Generate New Profits," Corporate Computing, Oct. 1992, pp. 193-195.
Begole et al., "Transparent Sharing of Java Applets: A Replicated Approach," Oct. 1997, pp. 55-65.
Black et al., "A Language for Distributed Programming," Department of Computer Science, University of Washington, Technical Report 86-02-03, Feb. 1986, p. 10.

Black et al., "Distribution and Abstract Types in Emerald," University of Washington, Technical Report No. 85-08-05, Aug. 1985, pp. 1-10.
Black et al., "Object Structure in the Emerald System," University of Washington, Technical Report 86-04-03, Apr. 1986, pp. 1-14.
Black et al., "The Eden Project: A Final Report," Department of Computer Science, University of Washington, Technical Report 86-11-01, Nov. 1986, pp. 1-28.
Black, "Supporting Distributed Applications: Experience with Eden," Department of Computer Science, University of Washington, Technical Report 85-03-02, Mar. 1985, pp. 1-21.
Black, "The Eden Programming Language," Department of Computer Science, FR-35, University of Washington, Technical Report 85-09-01, Sep. 1985 (Revised Dec. 1985), pp. 1-19.
Black, "The Eden Project: Overview and Experiences," Department of Computer Science, University of Washington, EUUG, Autumn '86 Conference Proceedings, Manchester, UK, Sep. 22-25, 1986, pp. 177-189.
Braine et al., "Object-Flow," 1997, pp. 418-419.
Bruno, "Working the Web," Data Communications, Apr. 1997, pp. 50-60.
Ciancarini et al., "Coordinating Distributed Applets with Shade/Java," Feb. 1998, pp. 130-138.
Cohen, "Electronic Commerce," USC/Information Sciences Institute, Oct. 1989.
Conhaim, "Online shopping: a beginner's guide; includes related listing of videotex services," Link-Up, vol. 5, No. 6, p. 32, Nov. 1988.
Coulouris et al., "Distributed Systems Concepts and Designs," Second Edition, Addison-Wesley, 1994.
Delcambre et al., "Simulation of the Object Flow Model: A Conceptual Modeling Language for Object-Driven Applications," 1993, pp. 216-225.
Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.
Ellsworth, "Boom Town," Internet World, Jun. 1995, pp. 33-35.
Estrin, "Inter-Organization Networks: Implications of Access Control Requirements for Interconnection Protocols," ACM, 1986, pp. 254-263.
Fleischer, "SkyMall's 'Supplier Network' Takes Flight", Retailtech, The Technology Magazine for Retail Executives, Apr. 1997.
Foley, "Managing Campus-Wide Information Systems: Issues and Problems," Capitalizing on Communication, ACM SIGUCCS XVII, 1989, pp. 169-174.
Fryxell, "eaasySABRE," Link-Up, May/Jun. 1996, pp. 10-11.
Gardner, "Kodak Follows Startup Into Online Photo Processing Business," Internet World, Sep. 8, 1997, pp. 5-6.
Gogan et al., "Open Market, Inc.: Managing in a Turbulent Environment," Harvard Business School Publishing, Aug. 29, 1996, pp. 1-30.
Goldberg et al., "Smalltalk-80—The Language and its Implementation," Xerox Palo Alto Research Center, 1983 (reprinted with corrections, Jul. 1985), pp. 1-720.
Hodges, Douglas, "Managing Object Lifetimes in OLE," Aug. 25, 1994, pp. 1-41.
Holman et al., "The Eden Shared Calendar System," Department of Computer Science, FR-35, University of Washington, Technical Report 85-05-02, Jun. 22, 1985, pp. 1-14.
Hsu, "Reimplementing Remote Procedure Calls," University of Washington, Thesis, Mar. 22, 1985, pp. 1-106.
Hutchinson, "Emerald: An Object-Based Language for Distributed Programming," a Dissertation, University of Washington, 1987, pp. 1-107.
Israel et al., "Authentication in Office System Internetworks," ACM Transactions on Office Information Systems, vol. 1, No. 3, Jul. 1983, pp. 193-210.
Jacob, "The Use of Distributed Objects and Dynamic Interfaces in a Wide-Area Transaction Environment," SIGCOMMn '95 Workshop on Middleware: Cambridge, Mass., Aug. 1995, pp. 1-3.
Jul et al., "Fine-Grained Mobility in the Emerald System," University of Washington, ACM Transactions on Computer Systems, vol. 6, No. 1, Feb. 1988, pp. 109-133.
Jul, "Object Mobility in a Distributed Object-Oriented System," a Dissertation, University of Washington, 1989, pp. 1-154 (1 page Vita).

(56) References Cited

OTHER PUBLICATIONS

Keller, "Smart Catalogs and Virtual Catalogs," Proceedings of the First USENIX Workshop of Electronic Commerce, USENIX Association, Jul. 11-12, 1995, pp. 125-131.
Klein et al., "TRADE'ex: The Stock Exchange of the Computer Industry," Harvard Business School Publishing, 1996, pp. 1-14.
Kodak PhotoNet FAQ, PhotoNet Online, Jun. 14, 2002, pp. 1-3.
Kolodner et al., "Atomic Garbage Collection: Managing a Stable Heap," ACM, 1989, pp. 15-25.
Koshizuka et al., "Window Real-Objects: A Distributed Shared Memory for Distributed Implementation of GUI Applications," Nov. 1993, pp. 237-247.
Kramer, "NETWATCH; The AJC's Daily Online Guide; Get the picture: Kodak will send photos to Web," The Atlanta Journal and Constitution, Sec. Features, p. 08C, Jun. 5, 1997.
Krasner et al., "Smalltalk-80: Bits of History, Words of Advice," 1983, Xerox Corporation, pp. 1-344.
Lampson et al., "Authentication in Distributed Systems: Theory and Practice," ACM Transactions n Computer Systems, vol. 10, No. 4, Nov. 1992, pp. 265-310.
Lansky, "Without APS, Photo Life Goes on Via Internet," Photographic Trade News, Aug. 1996, pp. 19-23.
Lavana et al., "Executable Workflows: A Paradigm for Collaborative Design on the Internet," Jun. 1997, 6 pages.
Lewis, "Pacific Bell, MCI to Expand Internet Service," The New York Times, sec. D, col. 1 at 3, Mar. 28, 1995.
LightSurf Instant Imaging—Press Releases, "Kodak and LightSurf Collaborate on Kodak Picture Center Online," LifeSurf Technologies Inc., Jun. 14, 2002, pp. 1-3.
Louwerse et al., "Data Protection Aspects in an Integrated Hospital Information System," North-Holland Computers & Security 3, 1984, pp. 286-294.
McEnaney, "Point-and-Click Memory Sharing; Launches PhotoNet online digital photography and imaging services," Photographic Trade News, Sec. p. 23, Jan. 1997.
Miller, "Web posting as a photo processing option," USA Today, Section: Life, p. 17D, Dec. 13, 1996.
Morris et al., "Andrew: A Distributed Personal Computing Environment," Communications of the ACM, vol. 29, No. 3, Mar. 1986, pp. 184-201.
O'Mahony, "Security Considerations in a Network Management Environment," IEEE Network, May/Jun. 1994, pp. 12-17.
Oppen et al., "The Clearinghouse: A Decentralized Agent for Locating Names Objects in a Distributed Environment," ACM Transactions on Office Information Systems, vol. 1, No. 3, Jul. 1983, pp. 230-253.
Osborn, "The Role of Polymorphism in Schema Evolution in an Object-Oriented Database," IEEE Transactions on Knowledge and Data Engineering, vol. 1, No. 3, Sep. 1989, pp. 310-317.
Petersen, "New but Not Improved," Direct Magazine, Nov. 1995.
Press Release, "Sun Goes Live With the Kodak Picture Network," Sun Microsystems, Inc., Jun. 14, 2002, pp. 1-2.
Proceedings of the Eighth Symposium on Operating Systems Principles, Dec. 14-16, 1981, ACM, Special Interest Group on Operating Systems, Association for Computing Machinery, vol. 15, No. 5, Dec. 1981, ACM Order No. 534810.
Proudfoot, "Replects: Data Replication in the Eden System," Department of Computer Science, University of Washington, Technical Report No. TR-85-12-04, Dec. 1985, pp. 1-156.
Pu, "Replication and Nested Transaction in the Eden Distributed System," Doctoral Dissertation, University of Washington, Aug. 6, 1986, pp. 1-179 (1 page Vita).
Raeder, "Is there a Prodigy in your future?," Database Searcher, vol. 5, No. 6, p. 18, Jun. 1989.
Ramm et al., "Exu—A System for Secure Delegation of Authority on an Insecure Network," Ninth System Administration Conference, 1995 LISA IX, Sep. 17-22, 1995, pp. 89-93.
Satyanarayanan, "Integrating Security in a Large Distributed System," ACM Transactions on Computer Systems, vol. 7, No. 3, Aug. 1989, pp. 247-280.
Schroeder et al., "Experience with Grapevine: The Growth of a Distributed System," ACM Transactions on Computer Systems, vol. 2, No. 1, Feb. 1984, pp. 3-23.
Senn, "Capitalizing on Electronic Commerce: The Role of the Internet in Electronic Markets," Information Systems Management, Summer 1996, pp. 15-24.
Steinke, "Design Aspects of Access Control in a Knowledge Base System," Computers & Security, 10, 1991, pp. 612-625.
Stern, "Industry Net," Link-Up, Mar./Apr. 1995, p. 10.
Tanenbaum et al., "Distributed Operating Systems," Computing Surveys, vol. 17, No. 4, Dec. 1985, pp. 419-470.
The Wall Street Journal, "Barclays Is Opening an 'Electronic Mall' for Internet Shopping," Tech. & Health Section at B2, Jun. 1, 1995.
The Wall Street Journal, "Prodigy Plans to Announce Internet 'Electronic Mail'," Tech. Section at B5, Nov. 27, 1995.
Trehan et al., "Toolkit for Shared Hypermedia on a Distributed Object Oriented Architecture," 1993, pp. 1-8.
Trommer, "Thomas Unveils Online Purchasing Network—Eases Product Sourcing and Ordering Through EDI," Electronic Buyers' News at 60, Dec. 11, 1995.
Van Den Berg et al., "Advanced Topics of a Computer Center Audit," North-Holland Computers & Security 3, 1984, pp. 171-185.
Van Der Lans, "Data Security in a Relational Database Environment," North-Holland Computers & Security 5, 1986, pp. 128-134.
Welz, "New Deals: A ripening Internet market, secure systems and digital currency are reshaping global commerce," Internet World, Jun. 1995, pp. 36-41.
Wobber et al., "Authentication in the Taos Operating System," ACM, 1993, pp. 256-269.
Wyatt, "Netscape Enterprise Server," Prima Publishing, 1996.
Yin et al., "Volume Leases for Consistency in Large-Scale Systems," IEEE Transactions on Knowledge & Data Engineering, vol. 11, No. 4, pp. 563-576, Jul./Aug. 1999.
"Java (TM) Object Serialization Specification," Sun Microsystems, Inc., XP-002242372, <www.dei.estg.iplei.pt/P3/N/material/extra/serial-spec-JDK1_2.pdf>, Nov. 30, 1998 (76 pages).
Chan, P. et al., The Java Class Libraries, $2^{nd}$ Edition, vol. 1, "Java.io ObjectInputStream," XP-002243027, pp. 1230-1232, 1262-1264, and 1283, Mar. 9, 1998 (7 pages).
Opyrchal et al., "Efficient Object Serialization in Java," Department of Electrical Engineering and Computer Science, University of Michigan, XP-002242373, May 31, 1999 (6 pages).
Auto-ID Center, "Auto-ID Savant Specification 1.0," Version of Oct. 13, 2003 (58 pages).
H.A. Smith and J.D. McKeen, "Object-Oriented Technology: Getting Beyond the Hype," ACM, Spring 1996, vol. 27, pp. 20-29.
Java Remote Method Invocation Specification, JDK 1.1 FCS, Sun Microsystems, Inc. Feb. 1997, chapters 5 and 7.
Jennings, N.R. et al., "Using Intelligent Agents to Manage Business Processes," Dept. Electronic Engineering, Queen Mary & Westfield College, Mile End Road, London, E1 4NS, U.K., XP-002254546, 1996 16 pages.
Wollrath et al., "JAVA-Centric Distributed Computing," IEEE Mirco May/Jun. 1997, pp. 44-53.
Amitabh, D., et al., Proxies, Application Interfaces, and Distributed Systems, IEEE, pp. 212-220, 1992.
Li, Sing et al., "Professional Jini", Chapter 7, Aug. 2000.
Spiteri, M.D., et al., "An architecture to support storage and retrieval of events", 1998.
"Dynamic code downloading using RMI", http://java.sun.com/j2se/1.4.2/docs/guide/mi/codebase.html, 2003. (9 pages).
"Passing Proxies as Parameters to Methods and Return Values from Methods," IBM Technical Disclosure Bulletin, vol. 41, No. 1, Jan. 1998, pp. 89-92.
"Jini Distributed Leasing Specification," Sun Microsystems, Jan. 1999, XP-002209076. (26 pages).
Subramanian, Sakthi et al., "Automatic Verification of Object Code Against Source Code," IEEE, 1996, pp. 46-55.
Wollrath, A., et al., "Simple Activation for Distributed Objects," USENIX Association, Conference on Object-Oriented Technologies (COOTS), Jun. 26-29, 1995. (11 pages).

(56) References Cited

OTHER PUBLICATIONS

Stoyenko, A.D. "SUPRA-RPC: SUbprogram PaRAmeters in Remote Procedure Calls," *Software-Practice and Experience*, vol. 24(1), pp. 27-49, 1994.
Black et al., "The Eden Report: A Final Report," Department of Computer Science, University of Washington, Technical Report 86-11-01, Nov. 1986, pp. 1-28.
Foley, "Managing Campus-Wide Information Systems: Issues and Problems," Capitalizing on Communication, ACM SIGUCCS XVII; 1989, pp. 169-174.
Mullender, *Distributed Systems*, Second Edition, Addison-Wesley, 1993.
Howard et al., *Scale and Performance in a Distributed File System*, ACM Transactions on Computer Systems, vol. 6, No. 1, Feb. 1988, pp. 51-81.
Cardelli, *Obliq, A lightweight language for network obiects*, Nov. 5, 1993, pp. 1-37.
Dijkstra, *Self-stabilizing Systems in Spite of Distributed Control*, Communications of the ACM, vol. 17, No. 11, Nov. 1974, pp. 643-644.
Ousterhout et al., *The Sprite Network Operating System*, Computer, IEEE, Feb. 1988, pp. 23-36.
Dourish, *A Divergence-Based Model of Synchrony and Distribution in Collaborative Systems*, Xerox Technical Report EPC-1194-102, 1994, pp. 1-10.
Sharrott et al., *ObjectMap: Integrating High Performance Resources into a Distributed Obiect-oriented Environment*, ICODP, 1995.
Birrell et al., *Grapevine: An Exercise in Distributed Computing*, Communications of the ACM, vol. 25, No. 4, Apr. 1982, pp. 260-274.
*Transparent Network Computing*, Locus Computing Corporation, Jan. 5, 1995.
Gray et al., *Leases: An Efficient Fault-Tolerant Mechanism for Distributed File Cache Consistency*, ACM, 1989, pp. 202-210.
Lamport et al., *The Byzantine Generals Problem*, ACM Transactions on Programming Languages and Systems, vol. 4, No. 3, Jul. 1982, pp. 382-401.
Dolev et al., *On the Minimal Synchronism Needed for Distributed Consensus*, Journal of the ACM, vol. 34, No. 1, Jan. 1987, pp. 77-97.
Mummert et al., *Long Term Distributed File Reference Tracing: Implementation and Experience*, Carnegie Mellon University School of Computer Science, Nov. 1994, pp. 1-28.
Gelernter et al., *Parallel Programming in Linda*, Yale University, Jan. 1985, pp. 1-21.
Cannon et al., *Adding Fault-Tolerant Transaction Processing to LINDA*, Software-Practice and Experience, vol. 24(5), May 1994, pp. 449-466.
Kambhatla et al., *Recovery with Limited Replay: Fault-Tolerant Processes in Linda*, Oregon Graduate Institute, Technical Report CSIE 90-019, Sep. 1990, pp. 1-16.
Anderson et al., *Persistent Linda: Linda + Transactions + Query Processing*, Proceedings of the 13th Symposium on Fault Tolerant Systems, 1994, pp. 93-109.
Gelernter, *Generative Communication in Linda*, ACM Transactions on Programming Languages and Systems, vol. 7, No. 1, Jan. 1985, pp. 80-112.
Carriero et al., *Distributed Data Structures in Linda*, Principals of Programming Language, 1986, pp. 1-16.
Pinakis, *Using Linda as the Basis of an Operating System Microkernel*, University of Western Australia, Department of Computer Science, Aug. 1993, pp. 1-165.
LINDA Database Search, Jul. 20, 1995, pp. 1-68.
Carriero et al, *Distributed Data Structures in Linda*, Yale Research Report YALEU/DCS/RR-438, Nov. 1985.
Agha et al., *Actorspaces: An Open Distributed Programming Paradigm*, University of Illinois, Report No. UIUCDCS-R-92-1766, Open Systems Laboratory TR No. 8, Nov. 1992, pp. 1-12.
Ahmed et al., *A Program Building Tool for Parallel Applications*, Yale University, Dec. 1, 1993, pp. 1-23.
Liskov et al., *Distributed Object Management in Thor*, International Workshop on Distributed Object Management, 1992, pp. 12.
Coulouris et al., *Distributed Systems Concepts and Designs*, Second Edition, Addison-Wesley, 1994.
Birrell et al., *Network Obiects*, DEC SRC Research Report 115, Feb. 28, 1994.
Birrell et al., *Distributed Garbage Collection for Network Objects*, DEC SRC Research Report 116, Dec. 15, 1993.
Jaworski, *Java 1.1 Developer's Guide*, Sams.net, 1997.
Wollrath et al., *A Distributed Obiect Model for the JavaJ System*, USENIX Association, Conference on Object-Oriented Technologies and Systems, Jun. 17-21, 1996.
Harris et al., *Proposal for a General Java Proxy Class for Distributed Systems and Other Uses*, Netscape Communications Corp., Jun. 25, 1997.
Hamilton, *Java and the Shift to Net-Centric Computing* Computer, Aug. 1996, pp. 31-39.
Chung et al., *A 'Tiny' Pascal Compiler: Part 1: The P-Code Interpreter*, BYTE Publications, Inc., Sep. 1978.
Chung et al., *A 'Tiny' Pascal Compiler: Part 2: The P-Compiler*, BYTE Publications, Inc., Oct. 1978.
Thompson, *Regular Expression Search Algorithm*, Communications of the ACM, vol. II, No. 6, p. 149 et seq., Jun. 1968.
Mitchell et al., *Mesa Language Manual*, Xerox Corporation.
McDaniel, *An Analysis of a Mesa Instruction Set*, Xerox Corporation, May 1982.
Pier, *A Retrospective on the Dorado, A High-Performance Personal Computer*, Xerox Corporation, Aug. 1983.
Pier, *A Retrospective on the Dorado, A High-Performance Personal Computer*, IEEE Conference Proceedings, The 10th Annual international Symposium on Computer Architecture, 1983.
Krasner, *The Smalltalk-80 Virtual Machine*, BYTE Publications Inc., Aug. 1991, pp. 300-320.
*Operating Systems Review*, ACM Press, vol. 27, No. 5, Dec. 1993, pp. 217-230.
*Remote Method Invocation Specification*, Sun Microsystems, Inc., (1997), http://java.sun.com/products/jdk/1.1/docs/guide/rmi/spec/rmiTOC.doc.html.
Birrell et al., *Implementing Remote Procedure Calls*, ACM Transactions on Computer Systems, vol. 2, No. 1, Feb. 1984, pp. 39-59.
IBM: SOMObjects Developer Toolkit Users Guide, Version 2.1, "Chapter 6—Distributed SOM (DSOM)," pp. 6-1-6-90, Oct. 1994.
Orfali R. et al., "The Essential Distributed Objects Survival Guide," Chapter 11: Corba Commercial ORBs, John Wiley & Sons, Inc., (1996).
Venners, B., "Jini Technology, Out of the Box", JAVAWORLD, 'Online!, pp. 1-4, Dec. 1998.
Alexander, et al., "Active Bridging", Proceedings of the ACM/SIGCOMM'97 Conference, Cannes, France, Sep. 1997.
Anonymous: "Change-Notification Service for Shared Files", IBM Technical Disclosure Bulletin, vol. 36, No. 8, pp. 77-82, Aug. 1993, XP002108713, New York, US.
Anonymous: "Resource Preemption for Priority Scheduling." Nov. 1973. IBM Technical Disclosure Bulletin, vol. 16, No. 6, p. 1931 XP002109435 New York, US.
Beech et al., "Object Databases as Generalizations of Relational Databases," Computer Standards & Interfaces, vol. 13, Nos. 1/3, pp. 221-230, (Jan. 1991) Amsterdam, NL.
Bertino et al., "Object-Oriented Database Management Systems: Concepts and Issues," Computer, vol. 24, No. 4, pp. 33-47, (Apr. 1991), Los Alamitos, CA.
Betz, Mark; "Interoperable objects: laying the foundation for distributed object computing"; Dr. Dobb's Journal, vol. 19, No. 11, p. 18(13); (Oct. 1994).
Bevan, D.I., "An Efficient Reference Counting Solution to the Distributed Garbage Collection Problem", Parall Computing, NL, Elsevier Publishers, Amsterdam, vol. 9, No. 2, pp. 179-192, Jan. 1989.
Birrell et al., "Implementing Remote Procedure Calls", ACM Transactions on Computer Systems, vol. 2, No. 1, Feb. 1984, pp. 39-59.
Dave A et al: "Proxies, Application Interface, and Distributed Systems", Proceedings International Workshop on Object Orientation in Operating Systems, Sep. 24, 1992, pp. 212-220.
Deux O et al: "The 02 System" Communications of the Association for Computing Machinery, vol. 34, No. 10, Oct. 1, 1991, pp. 34-48.

(56) References Cited

OTHER PUBLICATIONS

Drexler, K. Eric, et al., "Incentive Engineering for Computational Resource Management," The Ecology of Computation, Elsevier Science Publishers B.V., 1988, pp. 231-266.

Droms, R., "RFC 1541 Dynamic Host Configuration Protocol", http://www.cis.ohio-state.edu/htbin/rfc/rfc1541.html, Oct. 1993, pp. 1-33.

Emms J: "A Definition of an Access Control Systems Language" Computer Standards and Interfaces, vol. 6, No. 4, Jan. 1, 1987, pp. 443-454.

Gosling et al., "The Java (TM) Language Specification", Addison-Wesley, 1996.

Gottlob et al., "Extending Object-Oriented Systems with Roles," ACM Transactions on information systems, vol. 14, No. 3, pp. 268-296 (Jul. 1996).

Guth, Rob: "JavaOne: Sun to Expand Java Distributed Computing Effort", "http://www.sunworld.com/swol-02-1998/swol-02-sunspots.html," XP-002109935, p. 1, Feb. 20, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96-11, Department of Comp. Sci., Univ. of Arizona, Jun. 1996.

Hunt, N., "IDF: A Graphical Data Flow Programming Language for Image Processing and Computer Vision", Proceedings of the International Conference on Systems, Man, and Cybernetics, Los Angeles, Nov. 4-7, pp. 351-360, (1990).

IBM (TM) Technical Disclosure Bulletin, "Object Location Algorithm," vol. 36, No. 09B, pp. 257-258, Sep. 1993.

IBM (TM) Technical Disclosure Bulletin, "Retrieval of Qualified Variables Using Extendible Hashing," vol. 36, No. pp. 301-303, Dec. 1993.

Jones, Richard, et al., "Garbage Collection: Algorithms for Automatic Dynamic Memory Management," pp. 165-175, John Wiley & Sons, 1996.

Kay, Michael H. et al., "An Overview of the Raleigh Object-Oriented Database System", ICL Technical Journal, vol. 7, No. 4, pp. 780-798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Riggs Roger et al., "Pickling State in the Java (TM) System," USENIX Association Conference on Object-Oriented Technologies and Systems, Jun. 17-21, 1996, pp. 241-250.

Rosenberry et al., "Understanding DCE"; Chapters 1-3, 6; (1992).

Waldo J et al: "Events in an RPC based distributed system" Proceedings of the 1995 USENIX Technical Conference, Proceedings USENIX Winter 1995 Technical Conference, New Orleans, LA. USA, Jan. 16-20, 1995, pp. 131-142.

Wilson, P.R., et al., "Design of the Opportunistic Garbage Collector," Proceedings of the Object Oriented Programming Systems Languages and Applications Conference, New Orleans, vol. 24, No. 10, Oct. 1989.

Wu, Xuequn, "A Type system for an Object-Oriented Database System," Proceedings of the International Computer Software and Applications Conference (COMPSAC), pp. 333-338, Sep. 11-13, 1991, Tokyo, Japan.

Yemini, Y. and S. da silva, "Towards Programmable Networks", IFIP/IEEE International Workshop on Distributed Systems: Operations and Management, L'Aquila, Italy, Oct. 1996.

Aldrich et al., "Providing Easier Access to Remote Objects in Client-Server Systems," System Sciences, 1998, Proceedings of the 31st Hawaii Internat'l. Conference, Jan. 6-9, 1998, pp. 366-375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal," Distributed Computing Systems, 21st International Conference, pp. 146-153, Apr. 2000.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.

Gray et al., "Leases: An Efficient Fault-Tolerant Mechanism for Distributed File Cache Consistency," Proceedings of the 12th ACM Symposium on Operating Systems Principles, pp. 202-210, 1989.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hoshi et al., "Allocation of the Cross-Connect Function in Leased Circuit Networks," 1992, ICC'92, conference record, SUPERCOMM/ICC '02, D a New World of Communications, IEEE International Conference, pp. 1408-1412.

IBM Technical Disclosure Bulletin, "Local Network Monitoring to Populate Access Agent Directory," vol. 36, No. 09A, pp. 403-405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

MUX-Elektronik, Java 1.1 Interactive Course, www.lls.se/~mux/javaic.html, 1995.

Stevenson, "Token-Based Consistency of Replicated Servers," IEEE, CH2686-4/89/0000/0179, pp. 179-183, 1989.

Yin et al., "Using Leases to Support Server Driven Consistency in Large-Scale Systems," Computer Services Department, University of Texas at Austin, p. 285-294, May 26-28, 1998.

\* cited by examiner

DOWNLOADABLE SMART PROXIES FOR PERFORMING PROCESSING ASSOCIATED WITH A REMOTE PROCEDURE CALL IN A DISTRIBUTED SYSTEM

REFERENCE TO RELATED APPLICATIONS

The following identified U.S. patent applications are relied upon and are incorporated by reference in this application as if fully set forth.

Provisional U.S. Patent Application No. 60/076,048, entitled "Distributed Computing System," filed on Feb. 26, 1998.

U.S. Pat. No. 6,263,350, entitled "Method and System for Leasing Storage."

U.S. Pat. No. 6,247,026, entitled "Method, Apparatus, and Product for Leasing of Delegation Certificates in a Distributed System."

U.S. Pat. No. 6,421,704, entitled "Method, Apparatus and Product for Leasing of Group Membership in a Distributed System," filed on Mar. 20, 1998.

U.S. Pat. No. 6,016,500, entitled "Leasing for Failure Detection."

U.S. patent application Ser. No. 09/144,933, entitled "Method for Transporting Behavior in Event Based System," filed on Mar. 20, 1998.

U.S. Pat. No. 6,272,559 entitled "Deferred Reconstruction of Objects and Remote Loading for Event Notification in a Distributed System."

U.S. Pat. No. 6,487,607, entitled "Methods and Apparatus for Remote Method Invocation," filed on Mar. 20, 1998.

U.S. Pat. No. 6,134,603, entitled "Method and System for Deterministic Hashes to Identify Remote Methods."

U.S. Pat. No. 6,598,094, entitled "Method and Apparatus for Determining Status of Remote Objects in a Distributed System," filed on Mar. 20, 1998.

U.S. Pat. No. 6,237,024, entitled "Suspension and Continuation of Remote Methods."

U.S. Pat. No. 6,182,083, entitled "Method and System for Multi-Entry and Multi-Template Matching in a Database."

U.S. patent application Ser. No. 09/044,839, entitled "Method and System for In-Place Modifications in a Database," filed on Mar. 20, 1998.

U.S. Pat. No. 6,578,044, entitled "Method and System for Typesafe Attribute Matching in a Database," filed on Mar. 20, 1998.

U.S. Pat. No. 6,185,611, entitled "Dynamic Lookup Service in a Distributed System," filed on Mar. 20, 1998.

U.S. Pat. No. 6,560,656, entitled "Apparatus and Method for Providing Downloadable Code for Use in Communicating with a Device in a Distributed System," filed on Mar. 20, 1998.

U.S. Pat. No. 6,832,223, entitled "Method and System for Facilitating Access to a Lookup Service," filed on Mar. 20, 1998.

U.S. Pat. No. 6,466,947, entitled "Apparatus and Method for Dynamically Verifying Information in a Distributed System," filed on Mar. 20, 1998.

U.S. patent application Ser. No. 09/044,936, entitled "An Interactive Design Tool for Persistent Shared Memory Spaces," filed on Mar. 20, 1998.

U.S. Pat. No. 6,438,614, entitled "Polymorphic Token-Based Control," filed on Mar. 20, 1998.

U.S. Pat. No. 6,138,238, entitled "Stack-Based Access Control."

U.S. Pat. No. 6,226,746, entitled "Stack-Based Security Requirements."

U.S. Pat. No. 6,282,652, entitled "Per-Method Designation of Security Requirements."

FIELD OF THE INVENTION

The present invention relates to a system and method for transmitting objects between machines in a distributed system and more particularly relates to transmission of a representation of a remote object including code for local processing.

BACKGROUND OF THE INVENTION

Distributed programs which concentrate on point-to-point data transmission can often be adequately and efficiently handled using special-purpose protocols for remote terminal access and file transfer. Such protocols are tailored specifically to the one program and do not provide a foundation on which to build a variety of distributed programs (e.g., distributed operating systems, electronic mail systems, computer conferencing systems, etc.).

While conventional transport services can be used as the basis for building distributed programs, these services exhibit many organizational problems, such as the use of different data types in different machines, lack of facilities for synchronization, and no provision for a simple programming paradigm.

Distributed systems usually contain a number of different types of machines interconnected by communications networks. Each machine has its own internal data types, its own address alignment rules, and its own operating system. This heterogeneity causes problems when building distributed systems. As a result, program developers must include in programs developed for such heterogeneous distributed systems the capability of ensuring that information is handled and interpreted consistently in different machines.

However, one simplification is afforded by noting that a large proportion of programs use a request and response interaction between processes where the initiator (i.e. program initiating a communication) is blocked out until the response is returned and is thus idle during this time. This can be modeled by a procedure call mechanism between processes. One such mechanism is referred to as the remote procedure call (RPC).

RPC is a mechanism for providing synchronized communication between two processes (e.g., program, applet, etc.) running on the same machine or different machines. In a simple case, one process, e.g., a client program, sends a message to another process, e.g., a server program. In this case, it is not necessary for the processes to be synchronized either when the message is sent or received. It is possible for the client program to transmit the message and then begin a new activity, or for the server program's environment to buffer the incoming message until the server program is ready to process a new message.

RPC, however, imposes constraints on synchronism because it closely models the local procedure call, which requires passing parameters in one direction, blocking the calling process (i.e., the client program) until the called procedure of the server program is complete, and then returning a response. RPC thus involves two message transfers, and the synchronization of the two processes for the duration of the call.

The RPC mechanism is usually implemented in two processing parts using the local procedure call paradigm, one part being on the client side and the other part being on the server side. Both of these parts will be described below with reference to FIG. 1.

FIG. 1 is a diagram illustrating the flow of call information using an RPC mechanism. As shown in FIG. 1, a client program 100 issues a call (step 102). The RPC mechanism 101 then packs the call as arguments of a call packet (step 103), which the RPC mechanism 101 then transmits to a server program 109 (step 104). The call packet also contains information to identify the client program 100 that first sent the call. After the call packet is transmitted (step 104), the RPC mechanism 101 enters a wait state during which it waits for a response from the server program 109.

The RPC mechanism 108 for the server program 109 (which may be the same RPC mechanism as the RPC mechanism 101 when the server program 109 is on the same platform as the client program 100) receives the call packet (step 110), unpacks the arguments of the call from the call packet (step 111), identifies, using the call information, the server program 109 to which the call was addressed, and provides the call arguments to the server program 109.

The server program receives the call (step 112), processes the call by invoking the appropriate procedure (step 115), and returns a response to the RPC mechanism 108 (step 116). The RPC mechanism 108 then packs the response in a response packet (step 114) and transmits it to the client program 100 (step 113).

Receiving the response packet (step 107) triggers the RPC mechanism 101 to exit the wait state and unpack the response from the response packet (step 106). RPC 101 then provides the response to the client program 100 in response to the call (step 105). This is the process flow of the typical RPC mechanism modeled after the local procedure call paradigm. Since the RPC mechanism uses the local procedure call paradigm, the client program 100 is blocked at the call until a response is received. Thus, the client program 100 does not continue with its own processing after sending the call; rather, it waits for a response from the server program 109.

The Java™ programming language is an object-oriented programming language that is typically compiled into a platform-independent format, using a bytecode instruction set, which can be executed on any platform supporting the Java virtual machine (JVM). This language is described, for example, in a text entitled "The Java Language Specification" by James Gosling, Bill Joy, and Guy Steele, Addison-Wesley, 1996, which is incorporated herein by reference. The JVM is described, for example, in a text entitled "The Java Virtual Machine Specification," by Tim Lindholm and Frank Yellin, Addison Wesley, 1996, which is incorporated herein by reference. Java and Java-based trademarks are trademarks or registered trademarks of Sun Microsystems, Inc. in the United States and other countries.

Because the JVM may be implemented on, any type of platform, implementing distributed programs using the JVM significantly reduces the difficulties associated with developing programs for heterogenous distributed systems. Moreover, the JVM uses a Java remote method invocation system (RMI) that enables communication among programs of the system. RMI is explained in, for example, the following document, which is incorporated herein by reference: Remote Method Invocation Specification, Sun Microsystems, Inc. (1997), which is available via universal resource locator (URL) http://wwwjavasoft.com/products/jdk/1.1/docs/guide/rmi/spec/rmiTOC.doc.html.

FIG. 2 is a diagram illustrating the flow of objects in an object-oriented distributed system 200 including machines 201 and 202 for transmitting and receiving method invocations using the JVM. In system 200, machine 201 uses RMI 205 for responding to a call for object 203 by converting the object into a byte stream 207 including an identification of the type of object transmitted and data constituting the object. While machine 201 is responding, to the call for object 203, a process running on the same or another machine in system 200 may continue operation without waiting for a response to its request.

Machine 202 receives the byte stream 207. Using RMI 206, machine 202 automatically converts it into the corresponding object 204, which is a copy of object 203 and which makes the object available for use by a program executing on machine 202. Machine 202 may also transmit the object to another machine by first converting the object into a byte stream and then sending it to the third machine, which also automatically converts the byte stream into the corresponding object.

The communication between these machines sometimes involves, for example, repeated calls for the same information. These calls are made to a local proxy, which acts as a surrogate for the remote object in the address space of the client. Such a proxy will service the call by making a network request to the server object. Repeated calls to the same server object through a proxy can generate considerable network traffic, increasing the time and expense of obtaining the information. Accordingly, a need exists for a technique that reduces the amount of network communication in, for example, such a case.

SUMMARY OF THE INVENTION

A method consistent with the present invention transmits a request for a particular object. A response to the request is received, the response including code used to construct a representation of the requested object, the construction creating an object for processing calls to the object, local to the requesting object, using the representation.

Another method consistent with the present invention receives at a machine a request for a particular object. A response to the request is transmitted, the response including first code for constructing a representation of the object and including an indication of second code for processing, such that the construction creates an object for processing calls to the object, local to the requesting object, using the representation.

An apparatus consistent with the present invention transmits a request for a particular object. The apparatus receives a response to the request, the response including code used to construct a representation of the requested object, the construction creating an object for processing calls to the object, local to the requesting object, using the representation.

Another apparatus consistent with the present invention receives at a machine a request for a particular object. The apparatus transmits a response to the request, the response including first code for constructing a representation of the object and including an indication of second code for processing, such that the construction creates an object for processing calls to the object, local to the requesting object, using the representation.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Instead of receiving a proxy that only makes network requests to the object for which it is a surrogate, a machine in a distributed system receives a smart proxy. Such a proxy can respond to calls on the object for which it is a surrogate without making any network calls to increase program efficiency, or perform processing before making a network call or after the completion of the network call to increase program functionality. The term proxy generally refers to code or other mechanism used to act as a surrogate for a remote object in the address space of a machine, Systems transferring stubs and associated smart proxies may use a variant of an RPC or RMI, passing arguments and return values from one process to another process each of which may be on different machines. The term "machine" is used in this context to refer to a physical machine or a virtual machine. Multiple virtual machines may exist on the same physical machine. Examples of RPC systems include distributed computed environment (DCE) RPC and Microsoft distributed common object model (DCOM) RPC. A memory stores the stub and associated smart proxy, and this memory may include secondary sources such as a disk or receiving objects from the Internet.

Distributed Processing System

Figure 1:
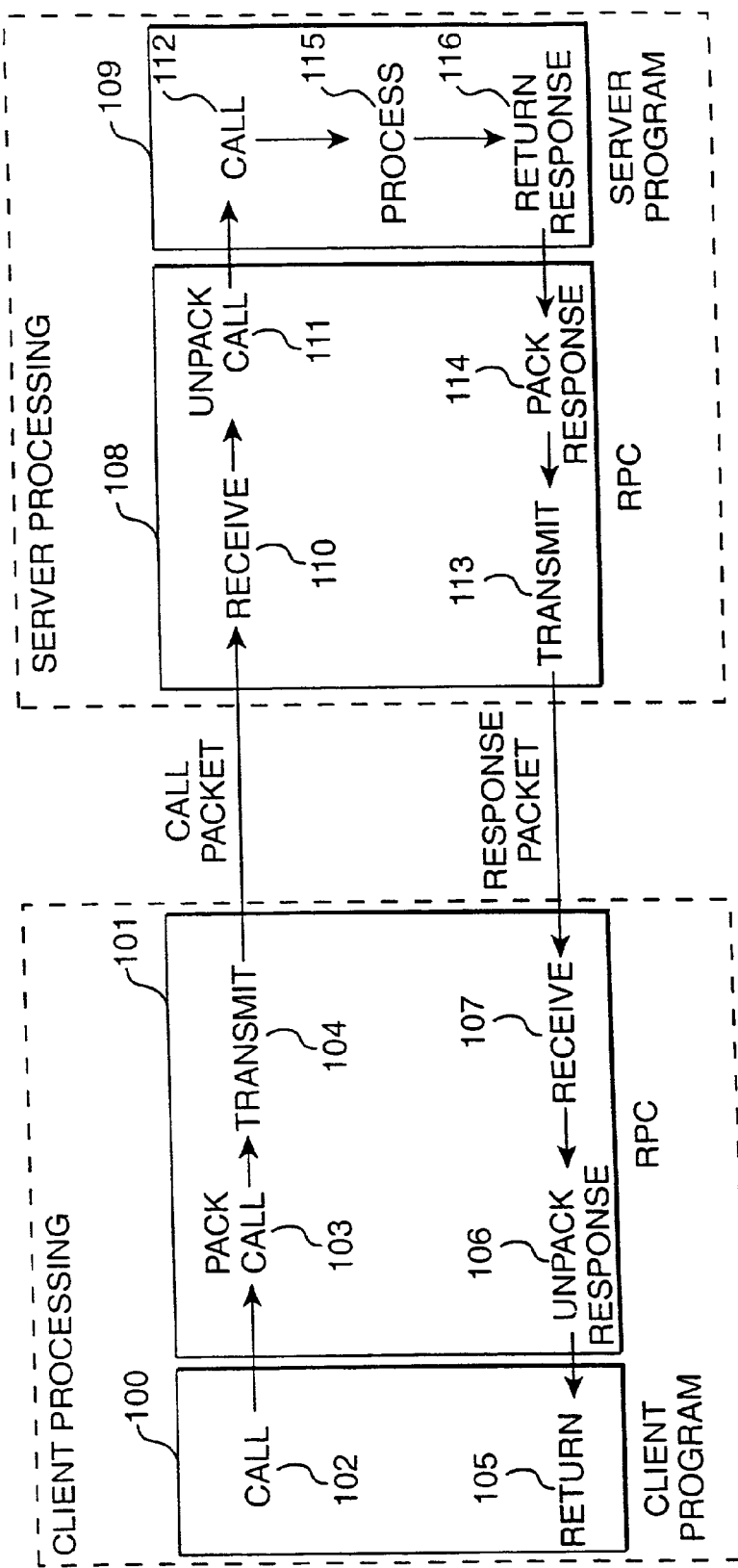
FIG. 1 is a diagram illustrating the flow of call information using an RPC mechanism.
Figure 2:
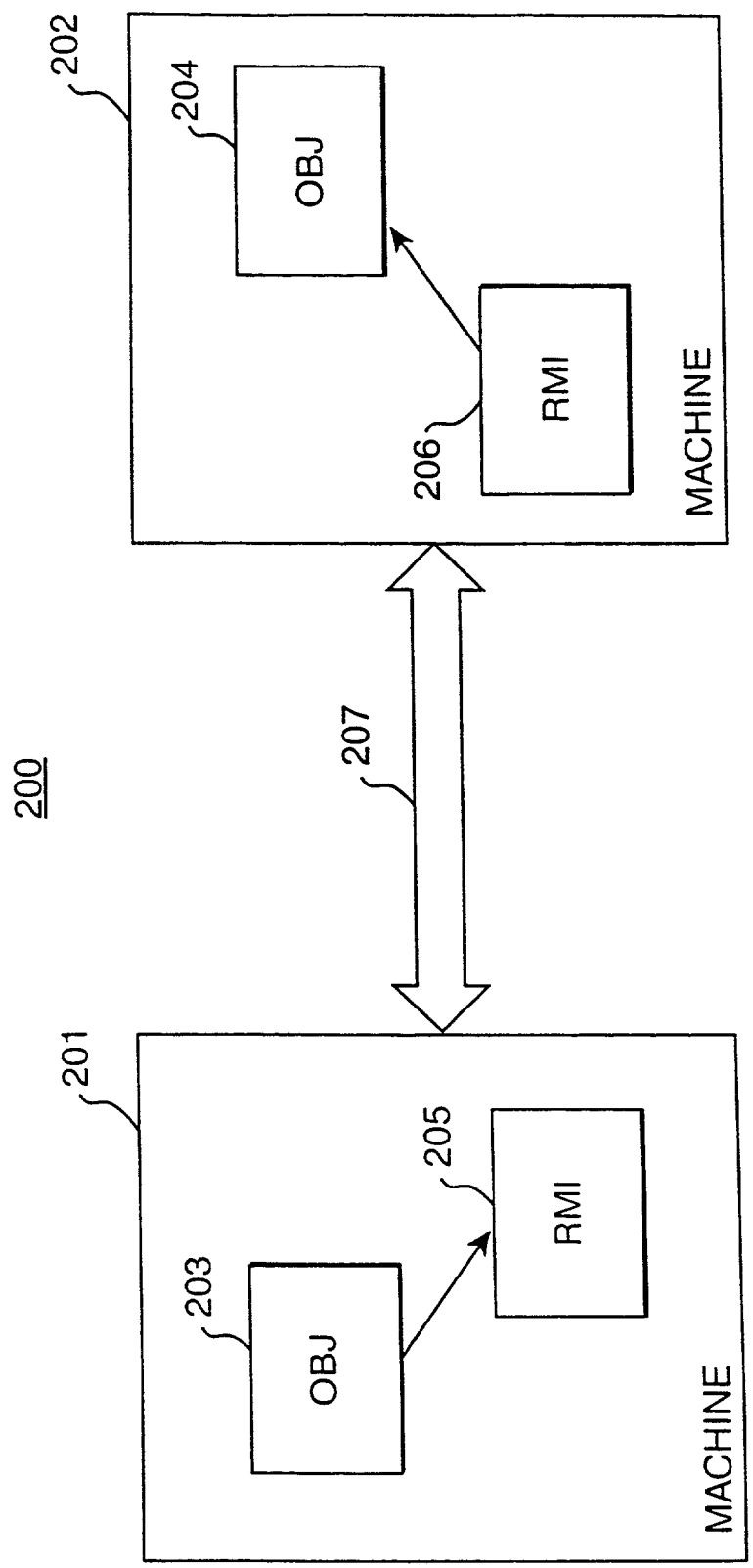
FIG. 2 is a diagram illustrating the transmission of objects in an object-oriented distributed system.
Figure 3:
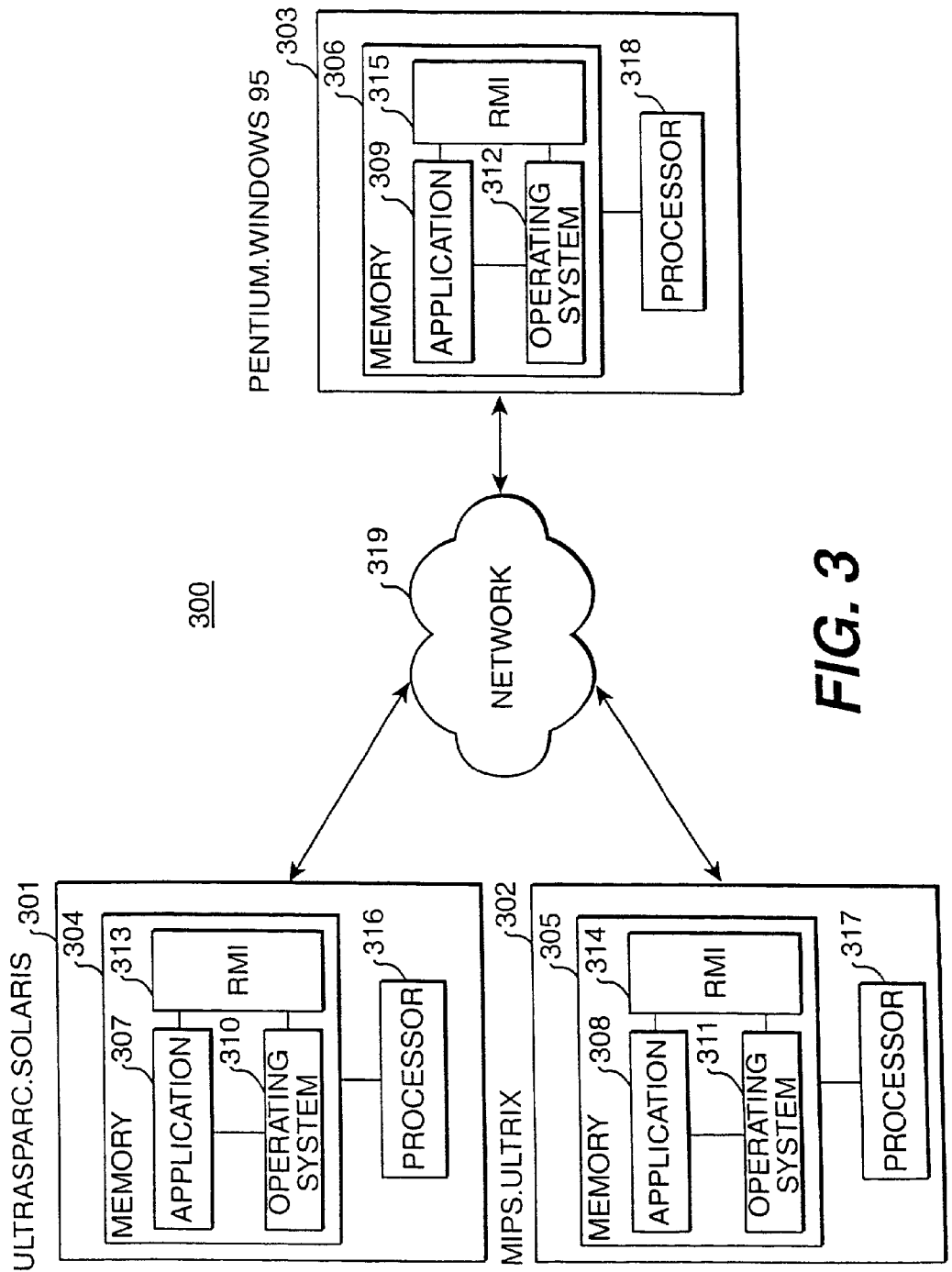
FIG. 3 is a diagram of an exemplary distributed processing system that can be used in an implementation consistent with the present invention.

FIG. 3 illustrates an exemplary distributed processing system 300 which can be used in an implementation consistent with the present invention. In FIG. 3, distributed processing system 300 contains three independent and heterogeneous platforms 301, 302, and 303 connected in a network configuration represented by network cloud 319. The composition and protocol of the network configuration represented by cloud 319 is not important as long as it allows for communication of the information between platforms 301, 302 and 303. In addition, the use of just three platforms is merely for illustration and does not limit an implementation consistent with the present invention to the use of a particular number of platforms. Further, the specific network architecture is not crucial to embodiments consistent with this invention. For example, another network architecture that could be used in an implementation consistent with this invention would employ one platform as a network controller to which all the other platforms would be connected.

In the implementation of distributed processing system 300, platforms 301, 302 and 303 each include a processor 316, 317, and 318 respectively, and a memory, 304, 305, and 306, respectively. Included within each memory 304, 305, and 306, are applications 307, 308, and 309, respectively, operating systems 310, 311, and 312, respectively, and RMI components 313, 314, and 315, respectively.

Applications 307, 308, and 309 can be applications or programs that are either previously written and modified to work with, or that are specially written to take advantage of, the services offered by an implementation consistent with the present invention. Applications 307, 308, and 309 invoke operations to be performed in accordance with an implementation consistent with this invention.

Operating systems 310, 311, and 312 are typically standard operating systems tied to the corresponding processors 316, 317, and 318, respectively. The platforms 301, 302, and 303 can be heterogenous. For example, platform 301 has an UltraSparc® microprocessor manufactured by Sun Microsystems, Inc. as processor 316 and uses a Solaris® operating system 310. Platform 302 has a MIPS microprocessor manufactured by Silicon Graphics Corp. as processor 317 and uses a Unix operating system 311. Finally, platform 303 has a Pentium microprocessor manufactured by Intel Corp. as processor 318 and uses a Microsoft Windows 95 operating system 312. An implementation consistent with the present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International Inc. in the United States and other countries. Products bearing SPARC trademarks are based upon an architecture developed by Sun Microsystems, Inc.

Memories 304, 305, and 306 serve several functions, such as general storage for the associated platform. Another function is to store applications 307, 308, and 309, RMI components 313, 314, and 315, and operating systems 310, 311, and 312 during execution by the respective processor 316, 317, and 318. In addition, portions of memories 304, 305, and 306 may constitute shared memory available to all of the platforms 301, 302, and 303 in network 319. Note that RMI components 313, 314, and 315 operate in conjunction with a JVM, which is not shown for the purpose of simplifying the figure.

Distributed System Infrastructure

Systems and methods consistent with the present invention may also operate within a particular distributed system 400, which will be described with reference to FIGS. 4 and 5. This distributed system 400 is comprised of various components, including hardware and software, to (1) allow users of the system to share services and resources over a network of many devices; (2) provide programmers with tools and programming patterns that allow development of robust, secured distributed systems; and (3) simplify the task of administering the distributed system. To accomplish these goals, distributed system 400 utilizes the Java programming environment to allow both code and data to be moved from device to device in a seamless manner. Accordingly, distributed system 400 is layered on top of the Java programming environment and exploits the characteristics of this environment, including the security offered by it and the strong typing provided by it.

Figure 4:
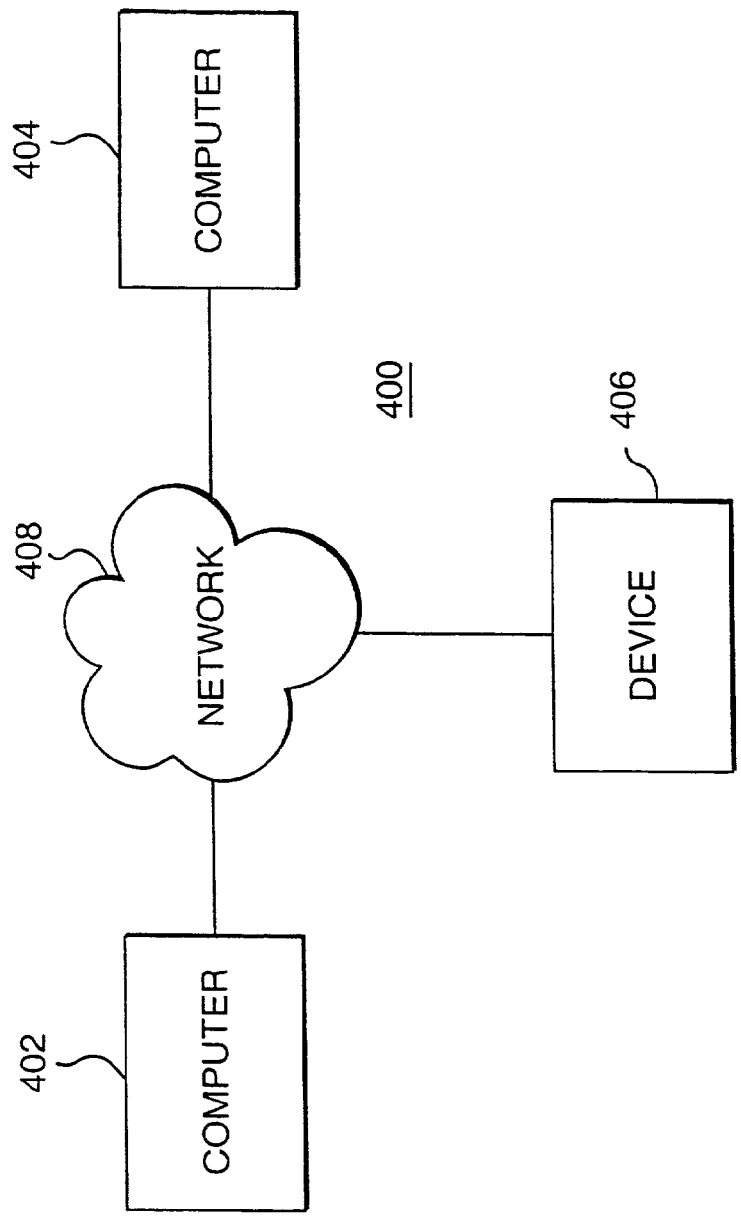
FIG. 4 is a diagram of an exemplary distributed system infrastructure.
Figure 5:
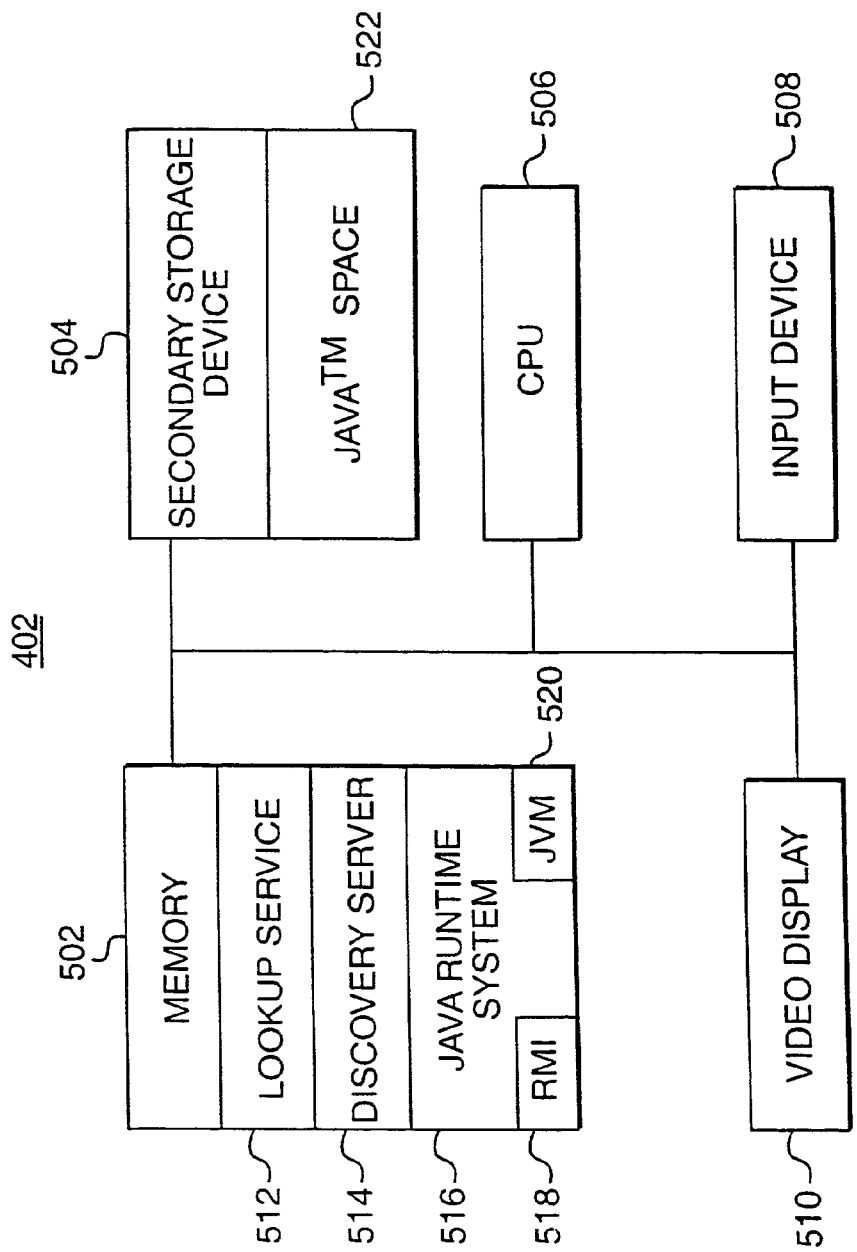
FIG. 5 is a diagram of a computer in a distributed system infrastructure shown in FIG. 4.

In distributed system 400 of FIGS. 4 and 5, different computers and devices are federated into what appears to the user to be a single system. By appearing as a single system, distributed system 400 provides the simplicity of access and the power of sharing that can be provided by a single system without giving up the flexibility and personalized response of a personal computer or workstation. Distributed system 400 may contain thousands of devices operated by users who are geographically disperse, but who agree on basic notions of trust, administration, and policy.

Within an exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as programs or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 400 is comprised of computer 402, a computer 404, and a device 406 interconnected by a network 408. Device 406 may be any of a number of devices, such as a printer, fax machine, storage device, computer, or other devices. Network 408 may be a local area network, wide area network, or the Internet. Although only two computers and one device are depicted as comprising distributed system 400, one skilled in the art will appreciate that distributed system 400 may include additional computers or devices.

FIG. 5 depicts computer 402 in greater detail to show a number of the software components of distributed system 400. One skilled in the art will appreciate that computer 404 or device 406 may be similarly configured. Computer 402 includes a memory 502, a secondary storage device 504, a central processing unit (CPU) 506, an input device 508, and a video display 510. Memory 502 includes a lookup service 512, a discovery server 514, and a Java runtime system 516. The Java runtime system 516 includes the Java RMI system 518 and a JVM 520. Secondary storage device 504 includes a Java space 522.

As mentioned above, distributed system 400 is based on the Java programming environment and thus makes use of the Java runtime system 516. The Java runtime system 516 includes the Java API libraries, allowing programs running on top of the Java runtime system to access, in a platform-independent manner, various system functions, including windowing capabilities and networking capabilities of the host operating system. Since the Java API libraries provide a single common API across all operating systems to which the Java runtime system is ported, the programs running on top of a Java runtime system run in a platform-independent manner, regardless of the operating system or hardware configuration of the host platform. The Java runtime system 516 is provided as part of the Java software development kit available from Sun Microsystems, Inc. of Mountain View, Calif.

JVM 520 also facilitates platform independence. JVM 520 acts like an abstract computing machine, receiving instructions from programs in the form of bytecodes and interpreting these bytecodes by dynamically converting them into a form for execution such as object code, and executing them. RMI 518 facilitates remote method invocation by allowing objects executing on one computer or device to invoke methods of an object on another computer or device. Both RMI and the JVM are also provided as part of the Java software development kit.

Lookup service 512 defines the services that are available for a particular Djinn. That is, there may be more than one Djinn and, consequently, more than one lookup service within distributed system 400. Lookup service 512 contains one object for each service within the Djinn, and each object contains various methods that facilitate access to the corresponding service. Lookup service 512 is described in U.S. patent application entitled "Method and System for Facilitating Access to a Lookup Service," which was previously incorporated herein by reference.

Discovery server 514 detects when a new device is added to distributed system 400, during a process known as boot and join (or discovery), and when such a new device is detected, the discovery server passes a reference to lookup service 512 to the new device so that the new device may register its services with the lookup service and become a member of the Djinn. After registration, the new device becomes a member of the Djinn, and as a result, it may access all the services contained in lookup service 512. The process of boot and join is described in U.S. patent application entitled "Apparatus and Method for providing Downloadable Code for Use in Communicating with a Device in a Distributed System," which was previously incorporated herein by reference.

A Java space 522 is an object repository used by programs within distributed system 400 to store objects. Programs use a Java space 522 to store objects persistently as well as to make them accessible to other devices within distributed system 400. Java spaces are described in U.S. patent application Ser. No. 08/971,529, entitled "Database System Employing Polymorphic Entry and Entry Matching," assigned to a common assignee, and filed on Nov. 17, 1997, which is incorporated herein by reference. One skilled in the art will appreciate that an exemplary distributed system 400 may contain many lookup services, discovery servers, and Java spaces.

Data Flow in a Distributed Processing System

Figure 6:
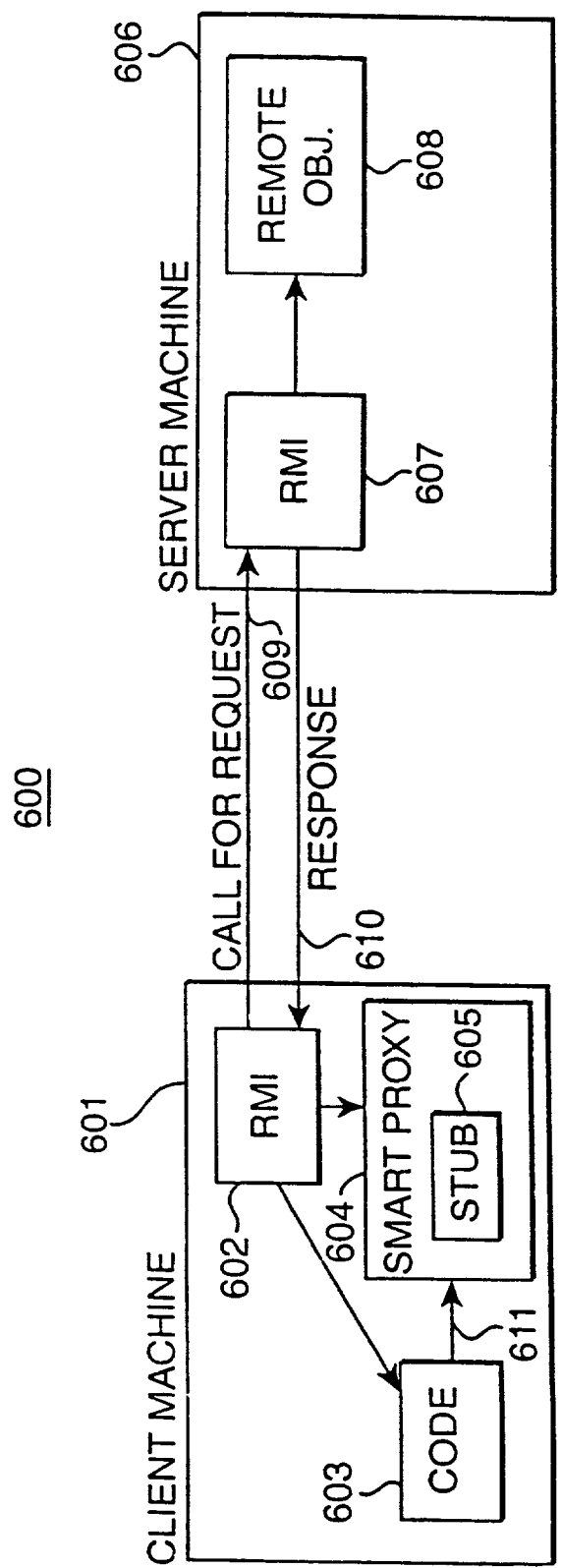
FIG. 6 is a block diagram of a distributed network for use in downloading smart proxies.

FIG. 6 is a block diagram of an object-oriented distributed network 600 connecting machines 601 and 606, such as computers or virtual machines executing on one or more computers, or the machines described with reference to FIGS. 3, 4, and 5. Network 600 transmits proxies, some of which may be smart proxies. A smart proxy includes code for performing processing associated with a call. For example, a smart proxy may perform a caching operation for read-only data for later reference. When a call is made for that data, the smart proxy may obtain it locally and provide it to a user without making another call for the data, which may occur transparent to the user. An example of such read-only data is a particular installation time. The first time a call is made for the installation time, for example, a smart proxy locally caches that value, and when a subsequent call is made for the installation time, the smart proxy locally retrieves the value.

Another example of smart proxy processing involves use of a serialized object for transmitting data to a data bank storing information. In this example, a call is made to a smart proxy, which receives an object, serializes the object on the client machine into an array of bytes, and transmits the array of bytes to a server. The server only stores the serialized object, avoiding the requirement to download code, and it provides a key for the object to the client machine. When the client machine wants to retrieve the data, the smart proxy transmits the key to the server, receives in response the serialized object, reconstructs the object, and provides it to the user.

Other examples of uses of smart proxies include processing for debugging, call logging, and monitoring system performance. Another example involves the use of a smart proxy for local data verification, as explained in U.S. patent application Ser. No. 09/044,932, filed on Mar. 20, 1998, assigned to a common assignee, and entitled "Apparatus and Method for Dynamically Verifying Information in a Distributed System," which is incorporated herein by reference. Many other uses for smart proxies are possible for performing processing associated with a call.

Network 600 includes a client machine 601 containing RMI 602 and associated code 603. A server machine 606 includes RMI 607 and remote object 608. In operation, RMI 602 transmits a call or request 609 to RMI 607, requesting a particular stub object. RMI 607 returns a response 610 including requested stub 605 embedded within a smart proxy 604. The response may be transmitted as a stream. Streams used in the Java programming language, including input and output streams, are known in the art and an explanation, which is incorporated herein by reference, appears in, for example, a text entitled "The Java Tutorial: Object-Oriented Programming for the Internet," pp. 325-53, by Mary Campione and Kathy Walrath, Addison-Wesley, 1996.

The response may include information so that client machine 601 can reconstruct the stub object in smart proxy 604. When a set of object types is limited and is the same on machines 601 and 606, a receiving machine typically requires the object's state and a description of its type because the object's code is already present on all network machines. Alternatively, machine 606 uses RMI 607 to provide more flexibility, allowing code to be moved when necessary along with information or the object's state and type. Additionally, a transmitting machine may include in the object an identification of the type of object transmitted, the data constituting the state of the object, and a network-accessible location in the form of a URL for code that is associated with the object. URLs are known in the art and an explanation, which is incorporated herein by reference, appears in, for example, a text entitled "The Java Tutorial: Object-Oriented Programming for the Internet," pp. 494-507, by Mary Campione and Kathy Walrath, Addison-Wesley, 1996.

When client machine 601 receives response 610, it identifies the type of transmitted object. Machine 601 contains its own RMI 602 and code 603 for processing of objects, and it may create stub object 605 using the object type, the state information, and code for the object. If code for the object is not resident or available on machine 601 and the stub object does not contain the code, RMI 602 may use a URL from the object to locate the code and transfer a copy of the code to client machine 601. Because the code is bytecodes and is therefore portable, client machine 601 can load the code into RMI 602 to reconstruct the object. Thus, client machine 601 can reconstruct an object of the appropriate type even if that kind of object has not been present on the machine before.

When creating stub object 605, RMI 602 does not necessarily know that the stub is itself a smart proxy 604. Smart proxy 604 may perform processing at client machine 601 before or after response 610 and may supply all processing without resorting to call 609 to the object for which the proxy acts. Therefore, smart proxy 604 may perform all processing locally when client machine 601 makes a call or request 611 to invoke a method on smart proxy 604. These proxies are downloadable by the same methods as disclosed in U.S. patent application Ser. No. 08/950,756, filed on Oct. 15, 1997, and entitled "Deferred Reconstruction of Objects and Remote Loading in a Distributed System," which is incorporated herein by reference.

Transmission of Smart Proxies

Figure 7:
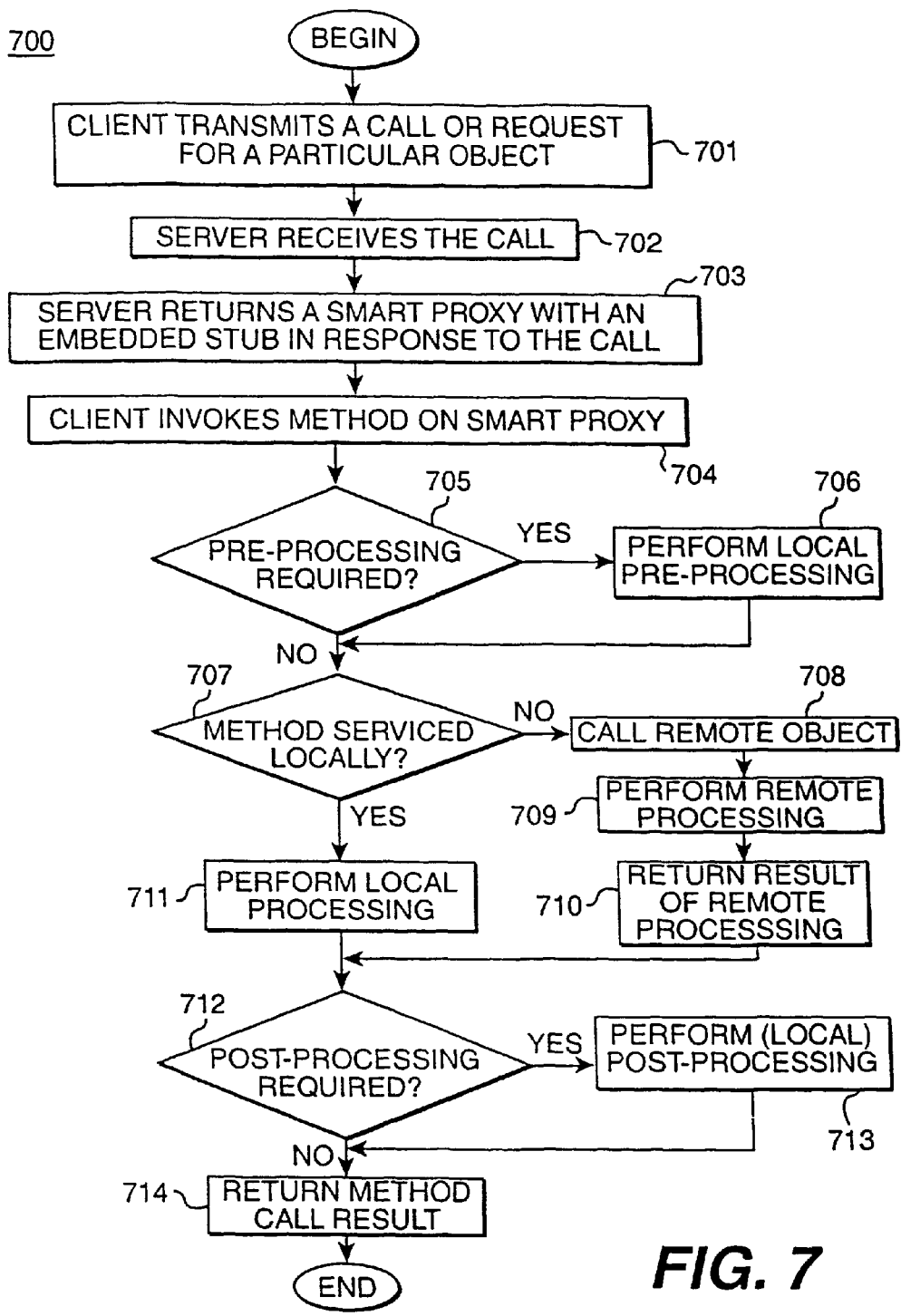
FIG. 7 is a flow chart of a process for downloading smart proxies within, for example, the distributed network shown in FIG. 6.

FIG. 7 is a flow chart of a process 700 for downloading and using smart proxies within, for example, the distributed network shown in FIG. 6. A client machine transmits a call or request for a particular object (step 701), and a server machine receives the call (step 702). In response, the server machine returns a smart proxy with an embedded stub (step 703), and the proxy acts as a representation of the requested object. After receiving the smart proxy, the client machine invokes a method on it (step 704). According to the code within the smart proxy, the client machine containing the smart proxy determines if preprocessing is required (step 705). If so, the processing is performed locally by the client machine using the smart proxy (step 706).

The client machine then determines if the method called on the smart proxy may be serviced locally (step 707). If so, the client machine performs the local processing for the call (step 711). If not, the client machine calls the remote object (step 708). The remote processing is performed (step 709), and the result of the remote processing is returned to the client machine (step 710).

The client machine determines, according to code in the smart proxy, if post-processing as a result of the call is required (step 712). If so, it locally performs the post-processing using code in the smart proxy (step 713). The smart proxy then returns the method call result (step 714) in response to the call on the smart proxy in step 704.

Figure 8:
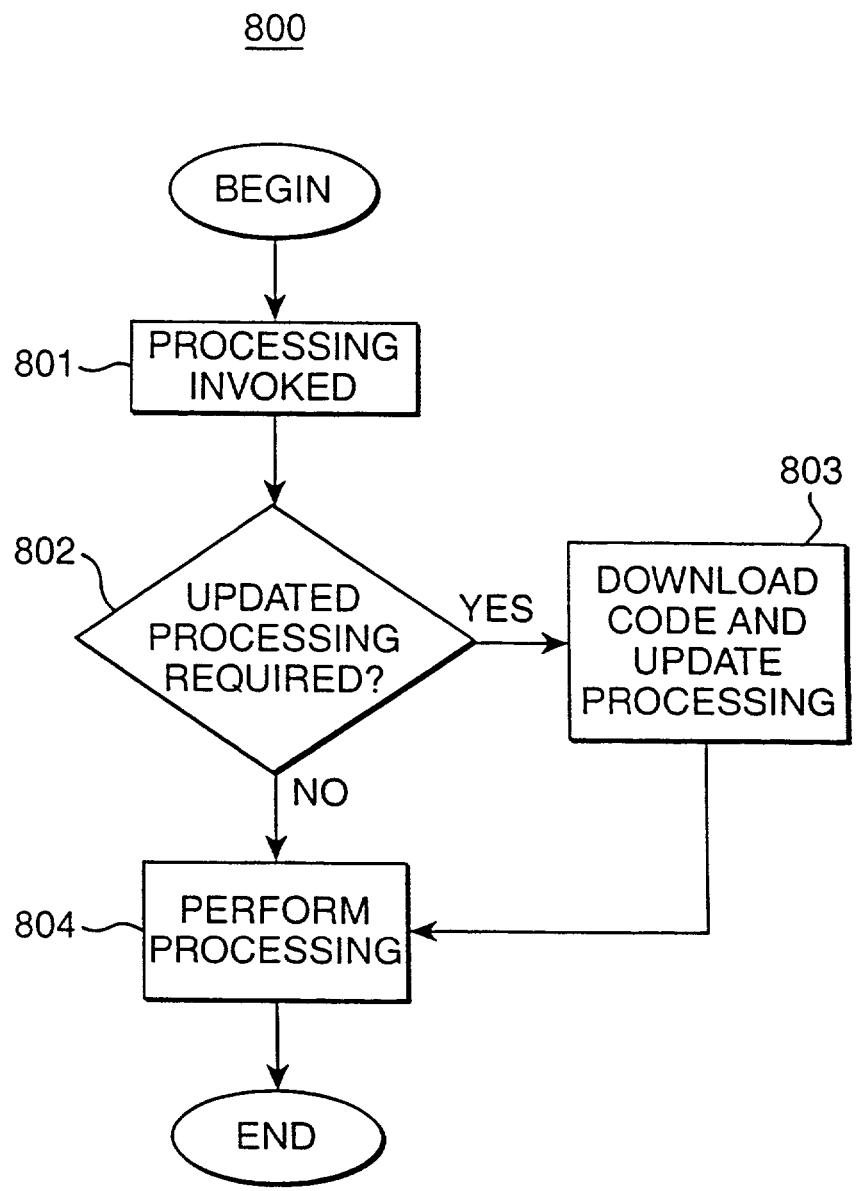
FIG. 8 is a flow chart of a process for changing the processing performed by a smart proxy.

FIG. 8 is a flow chart of a process 800 for changing the processing performed by a smart proxy. When processing is invoked (step 801), a client machine determines if updated processing is required (step 802). Such information may be contained within the smart proxy itself in that it may determine when or under what particular circumstances it requires updated processing code. If updated processing is required, the code for that processing is downloaded and the smart proxy is updated at the client machine to perform that processing (step 803). The smart proxy then performs at the client machine the processing according to the updated code (step 804).

Machines implementing the steps shown in FIGS. 7 and 8 may include computer processors for performing the functions, as shown in FIGS. 3, 4, 5, and 6. They may include modules or programs configured to cause the processors to perform the above functions. They may also include computer program products stored in a memory. The computer program products may include a computer-readable medium or media having computer-readable code embodied therein for causing the machines to perform functions described above. The computer readable media may include sequences of instructions which, when executed by a processor, cause the processor to securely address a peripheral device at an absolute address by performing the method described in this specification. The media may also include a data structure for use in performing the method described in this specification.

Although the illustrative embodiments of the systems consistent with the present invention are described with reference to a computer system implementing the Java programming language on the JVM specification, the invention is equally applicable to other computer systems processing code from different programming languages. Specifically, the invention may be implemented with both object-oriented and nonobject-oriented programming systems. In addition, although an embodiment consistent with the present invention has been described as operating in the Java programming environment, one skilled in the art will appreciate that the present invention can be used in other programming environments as well.

While the present invention has been described in connection with an exemplary embodiment, it will be understood that many modifications will be readily apparent to those skilled in the art, and this application is intended to cover any adaptations or variations thereof. For example, different labels or definitions for the smart proxies may be used without departing from the scope of the invention. This invention should be limited only by the claims and equivalents thereof.

What is claimed is:

1. A method for processing calls to a server object locally by a processor at a smart proxy residing in a memory at a client machine, the method comprising:

obtaining the smart proxy at the client machine, the smart proxy including stub code corresponding to a stub object for the server object that is used to construct a representation of the stub object for the server object in the smart proxy in the memory at the client machine and the smart proxy including processing code executable by a processor at the client machine for processing calls to the server object locally at the stub object in the smart proxy as a representation of the server object at the client machine;

constructing the representation of the stub object for the server object in the smart proxy in the memory at the client machine using the stub code; and processing one or more calls to the server object locally at the stub object in the smart proxy using the processor at the client machine using the processing code of the smart proxy at the client machine to generate a response to the one or more calls without communicating the one or more calls to a server machine having the server object.

2. The method of claim 1, further including: processing additional calls to the server object at a server machine when processing said additional calls cannot be completed locally using the processor at the client machine using the stub object in the smart proxy as a representation of the server object at the client machine.

3. The method of claim 1, further including: downloading, to the client machine, update code to update the processing code.

4. A method for sharing objects between a client machine and a server machine in a distributed system for processing calls to the server machine locally at the client machine, comprising:

sending a request for a server object from the client machine to the server machine; and responsive to the request, sending a smart proxy from the server machine to the client machine, the smart proxy including:

stub code used to construct a stub object corresponding to the server object in the smart proxy in a memory at the client machine, and an indication of processing code for processing calls to the server object in the smart proxy using a processor at the client machine;

wherein when the stub object in the memory at the client machine is constructed and the processing code is executed in the smart proxy by the processor on the client machine, the stub object in the smart proxy at the client machine intercepts at least one call to the server object without transmitting the at least one call to the server object residing on the server and processes the at least one call locally in the smart proxy using the processor at the client machine to generate a response to the at least one call using the stub object in the memory at the client machine and the processing code.

5. The method of claim 4, further including:

using the stub code by the smart proxy at the client machine to construct the stub object in the smart proxy at the client machine.

6. The method of claim 4, further including:

downloading processing code to the client machine using the indication to update the processing code executed in the smart proxy at the client machine for processing the at least one call to the server object locally in the smart proxy at the client machine using the stub object at the client machine.

7. The method of claim 4, further including:

sending additional calls to the server object at the server machine when processing of the additional calls cannot be completed locally in the smart proxy at the client machine; and processing the additional calls to the server object at the server machine when processing of the additional calls cannot be completed locally at the client machine using the stub object at the client machine.

8. The method of claim 4, further including:

receiving the request for the server object at the server machine; and receiving the response from the server machine at the client machine after processing the request to the server object at the server machine.

9. A system for processing calls to a server object locally at a smart proxy residing at a client machine, comprising:

a server machine having the server object in a server memory of the server machine for processing calls at a server processor at the server machine and generating a response;

wherein the client machine:

(i) obtains a smart proxy from the server machine, the smart proxy including stub code for constructing a stub object in the smart proxy for storage in a client memory at the client machine that is a representation of the server object and processing code for configuration of a client processor at the client machine for processing calls to the server object locally in the smart proxy using the client processor at the client machine, (ii) constructs the stub object in the smart proxy in the client memory at the client machine using the stub code, and (iii) processes at least one call to the server object locally in the smart proxy using the client processor at the client machine using the processing code to generate a response to the at least one call locally at the client machine without communicating the at least one call to the server machine; and a network connecting the client machine and the server machine.

10. The system of claim 9, wherein the server machine is configured to process additional calls to the server object when processing of the additional calls cannot be completed locally in the smart proxy at the client machine using the stub object in the smart proxy at the client machine.

11. The system of claim 9, wherein the client machine is further configured to download update code to update the processing code.

12. A system for sharing objects in a distributed system for processing calls to a server machine locally at a client machine, comprising:
- the client machine configured to send a request for a server object to the server machine;
- the server machine configured to send, responsive to the request, a smart proxy to the client machine, the smart proxy including:
    - stub code for constructing a stub object corresponding to the server object in the smart proxy in a memory at the client machine, and
    - an indication of processing code for configuration of a processor at the client machine for processing calls to the server object in the smart proxy using the stub object at the processor at the client machine such that the stub object in the smart proxy at the client machine processes one or more calls to the server object locally in the smart proxy using the processor at the client machine to generate a response to the one or more calls without sending the one or more calls to the server machine, and
- a network connecting the client machine and the server machine.

13. The system of claim 12, wherein the client machine is further configured to construct the stub object from the stub code.

14. The system of claim 12, wherein the client machine is further configured to download code to update the processing code.

15. The system of claim 12, wherein the server machine is further configured to process additional calls to the server object at the server machine when processing the additional calls cannot be completed locally in the smart proxy at the client machine using the stub object.

16. The system of claim 12, wherein the client machine is further configured to send the request from the client machine to the server machine, and to receive the smart proxy from the server machine; and wherein, the server machine is further configured to receive the request for the server object.

* * * * *